(12) United States Patent
Lee

(10) Patent No.: US 7,256,910 B2
(45) Date of Patent: Aug. 14, 2007

(54) COLOR SEPARATION METHOD AND PRINTED PRODUCT OF THE METHOD

(75) Inventor: David L. Lee, Tacoma, WA (US)

(73) Assignee: Weyerhaeuser Company, Federal Way, WA (US)

( * ) Notice: Subject to any disclaimer, the term of this patent is extended or adjusted under 35 U.S.C. 154(b) by 892 days.

(21) Appl. No.: 10/128,969

(22) Filed: Apr. 23, 2002

(65) Prior Publication Data

US 2003/0197877 A1   Oct. 23, 2003

(51) Int. Cl.
  *G06F 15/00* (2006.01)
(52) U.S. Cl. .................... 358/1.9; 358/518; 358/2.1; 358/3.27; 347/232; 347/240
(58) Field of Classification Search ............... 358/1.9, 358/518, 2.1, 3.27; 347/232, 240
  See application file for complete search history.

(56) References Cited

U.S. PATENT DOCUMENTS

| | | | | |
|---|---|---|---|---|
| 5,689,425 A | * | 11/1997 | Sainio et al. ............... 700/124 |
| 5,771,107 A | * | 6/1998 | Fujimoto et al. ........... 358/464 |
| 5,801,745 A | * | 9/1998 | Wada et al. ................. 347/232 |
| 5,802,361 A | * | 9/1998 | Wang et al. ................. 382/217 |
| 5,946,112 A | * | 8/1999 | Kobayashi ................... 358/518 |
| 6,018,600 A | * | 1/2000 | Levin et al. ................. 382/284 |
| 6,236,754 B1 | | 5/2001 | Harrington ................... 382/199 |

* cited by examiner

*Primary Examiner*—Kimberly A. Williams
*Assistant Examiner*—Michael Burleson

(57) ABSTRACT

A method is described for overcoming the adverse visual effect of misregistered ink planes in multiple ink color prints. Color separations are initially made in a normal fashion. The separation carrying the greatest object detail is then chosen as a luminance or achromatic channel. This may be used as is or preferably it is sharpened using a high pass filter. Normally this separation will be black. However, it may be a surrogate color for black, particularly if only two or three separations are made. Object detail in all other separations (chrominance separations) is degraded, usually by a low pass filter such as a Gaussian blur. The printed image formed when the separations are recombined in a conventional manner is remarkably visually tolerant of misregistration of the various ink planes in the image.

9 Claims, 42 Drawing Sheets

CONTRAST MODULATION AS A FUNCTION OF SINUSOIDAL TEST PATTERNS OF VARYING SPATIAL FREQUENCIES.

CONTRAST MODULATION AS A FUNCTION OF SINUSOIDAL TEST PATTERNS OF VARYING SPATIAL FREQUENCIES.

CHROMATICITY AND LUMINOSITY MODULATION TRANSFER FUNCTIONS (MTF). CHROMATIC ACUITY IS LOW-PASS, LUMINANCE ACUITY IS BAND-PASS (FROM E. GRANGER).

EACH SEPARATION MOVED TO CREATE
AN OUT-OF-REGISTER COMPOSITE

CMYK ORIGINAL IN-REGISTER

FOUR-COLOR CMYK ORIGINAL IN-REGISTER.

FOUR-COLOR CMYK OUT-OF-REGISTER 2.5 MM (1/10").

TWO-COLOR RED-GREEN REPRODUCTION IN-REGISTER.

TWO-COLOR RED-GREEN OUT-OF-REGISTER 2.5 MM (1/10").

TWO-COLOR RED-GREEN REPRODUCTION WITH METHOD OF INVENTION IN-REGISTER.

TWO-COLOR RED-GREEN WITH METHOD OF INVENTION OUT-OF-REGISTER 2.5 MM (1/10").

GREYSCALE POSITIVE OF RED INK SEPARATION WITH METHOD OF INVENTION.

GREYSCALE POSITIVE OF RED INK SEPARATION WITHOUT METHOD OF INVENTION.

GREYSCALE POSITIVE OF GREEN INK SEPARATION WITH METHOD OF INVENTION.

GREYSCALE POSITIVE OF GREEN INK SEPARATION WITHOUT METHOD OF INVENTION.

FOUR-COLOR CMYK ORIGINAL OUT-OF-REGISTER 2.5 MM (1/10").

FOUR-COLOR CMYK ORIGINAL IN-REGISTER.

THREE-COLOR MYK REPRODUCTION OUT-OF-REGISTER 2.5 MM (1/10").

THREE-COLOR MYK REPRODUCTION IN-REGISTER.

THREE-COLOR MYK REPRODUCTION WITH METHOD OF INVENTION OUT-OF-REGISTER 2.5 MM (1/10").

THREE-COLOR MYK REPRODUCTION WITH METHOD OF INVENTION IN-REGISTER.

GREYSCALE POSITIVE OF MAGENTA SEPARATION WITHOUT METHOD OF INVENTION.

GREYSCALE POSITIVE OF MAGENTA SEPARATION WITH METHOD OF INVENTION.

GREYSCALE POSITIVE OF YELLOW
SEPARATION WITHOUT METHOD OF INVENTION.

GREYSCALE POSITIVE OF YELLOW
SEPARATION WITH METHOD OF INVENTION.

GREYSCALE POSITIVE OF BLACK SEPARATION WITHOUT METHOD OF INVENTION.

GREYSCALE POSITIVE OF BLACK SEPARATION WITH METHOD OF INVENTION.

CONVENTIONAL CMYK ORIGINAL IN-REGISTER.

CONVENTIONAL CMYK ORIGINAL OUT-OF-REGISTER
2.5 MM (1/10").

MODIFIED CMYK REPRODUCTION IN-REGISTER.

MODIFIED CMYK REPRODUCTION OUT-OF-REGISTER
2.5 MM (1/10").

MODIFIED CMYK REPRODUCTION WITH METHOD OF INVENTION, IN-REGISTER.

MODIFIED CMYK REPRODUCTION WITH METHOD OF INVENTION, OUT-OF-REGISTER 2.5 MM (1/10").

FIGURE 18A WITH BLACK BORDER APPLIED TO FRAME IMAGE.

FIGURE 18B WITH BLACK BORDER APPLIED TO FRAME IMAGE.

GREYSCALE POSITIVE OF CYAN SEPARATION
WITH METHOD OF INVENTION.

GREYSCALE POSITIVE OF CYAN SEPARATION
WITH CONVENTIONAL SEPARATION.

GREYSCALE POSITIVE OF MAGENTA SEPARATION WITH METHOD OF INVENTION.

GREYSCALE POSITIVE OF MAGENTA SEPARATION WITH CONVENTIONAL SEPARATION.

GREYSCALE POSITIVE OF YELLOW SEPARATION WITH METHOD OF INVENTION.

GREYSCALE POSITIVE OF YELLOW SEPARATION WITH CONVENTIONAL SEPARATION.

GREYSCALE POSITIVE OF BLACK SEPARATION WITH
METHOD OF INVENTION.

GREYSCALE POSITIVE OF BLACK SEPARATION WITH
CONVENTIONAL SEPARATION.

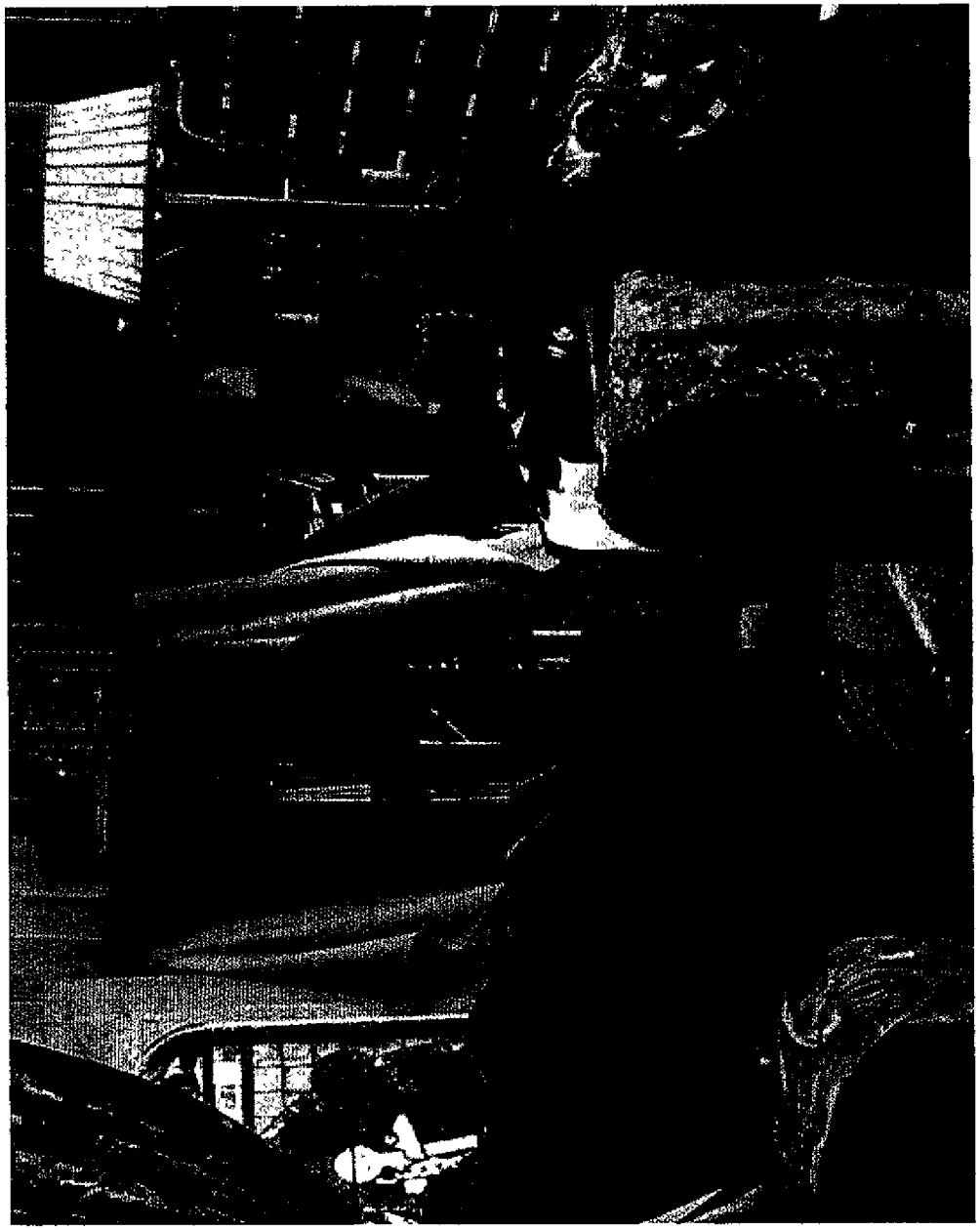
FIG. 24 A CONVENTIONAL CMYK REPRODUCTION IN-REGISTER.

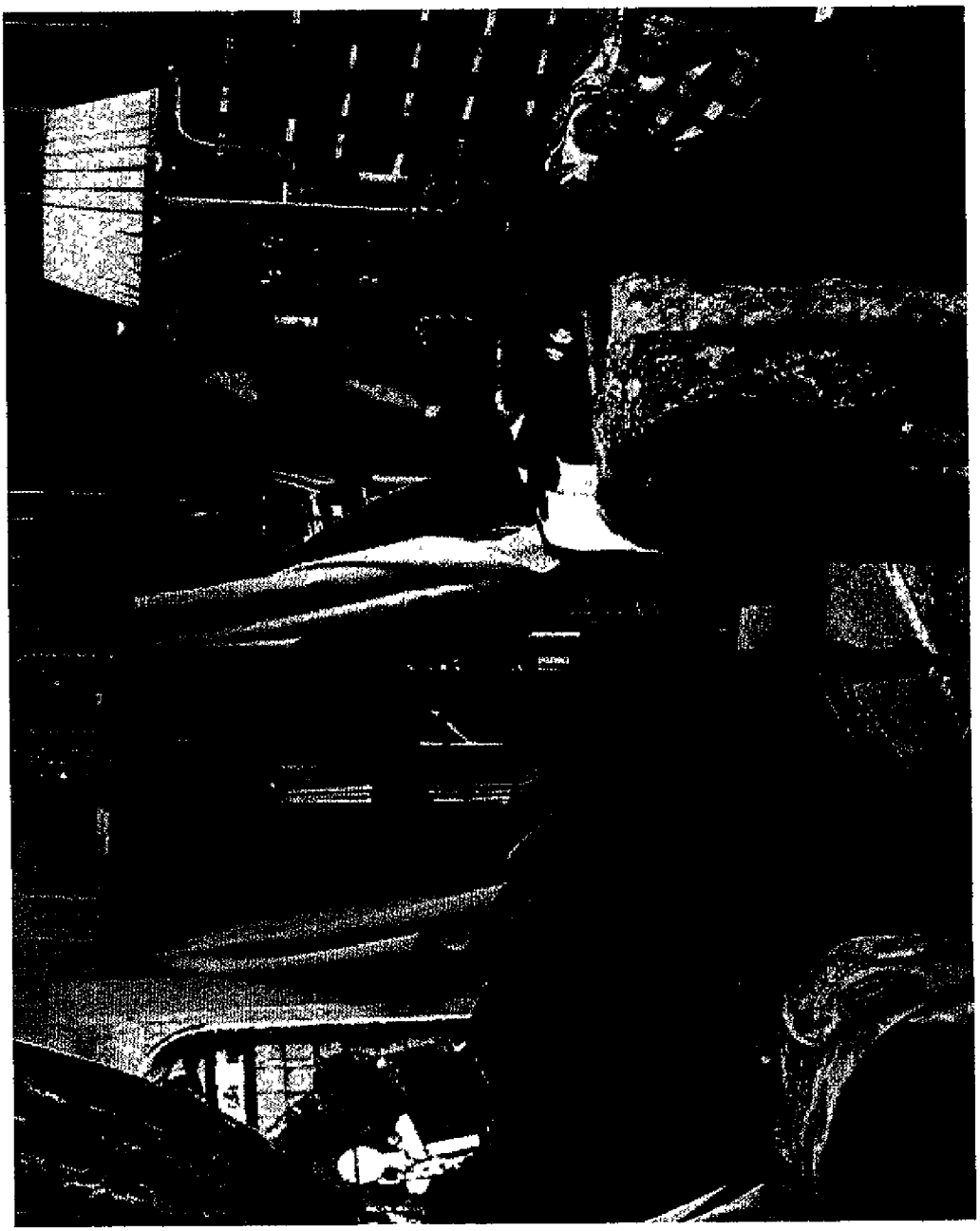
FIG. 24B MODIFIED CMYK REPRODUCTION IN-REGISTER.

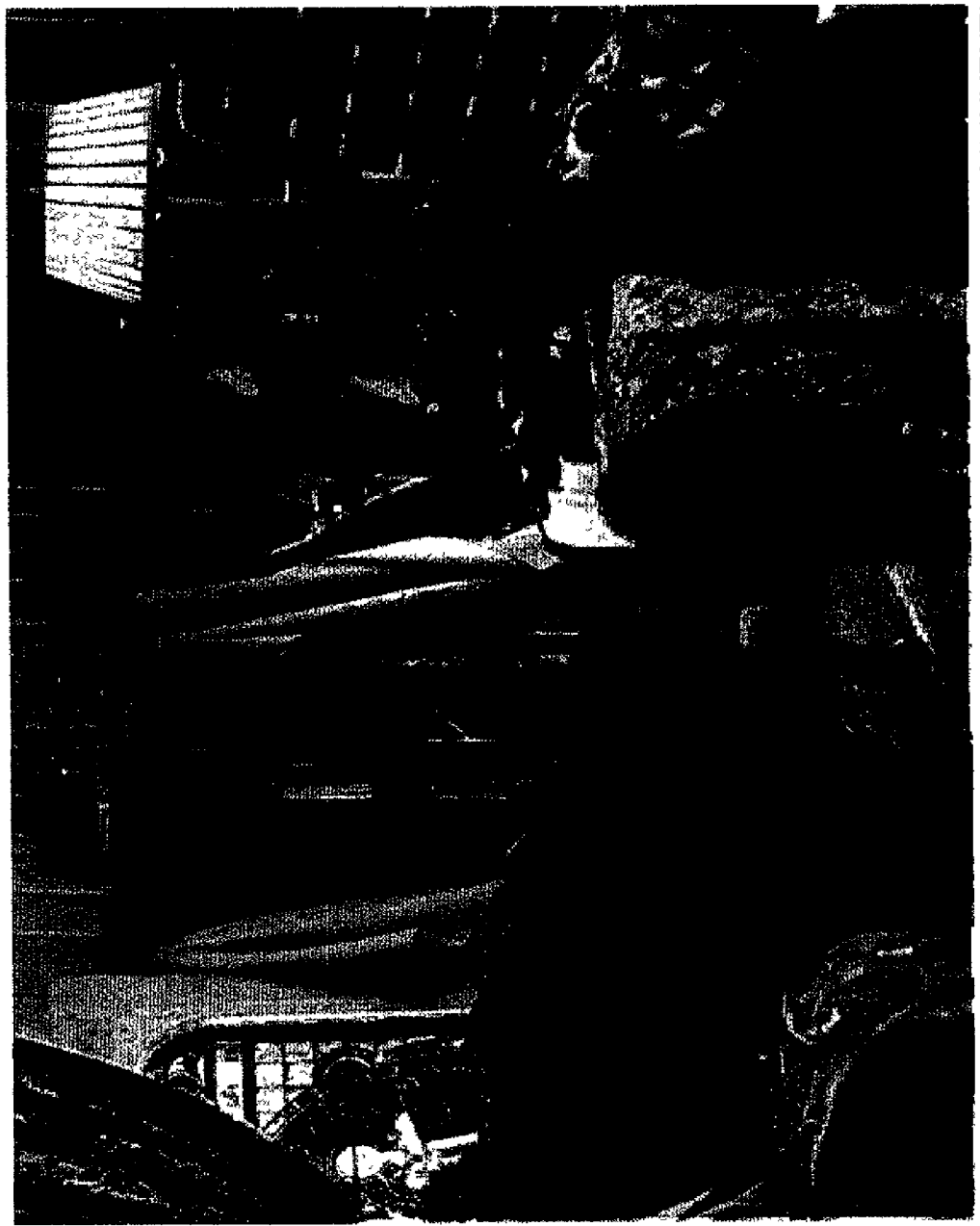
FIG. 25A CONVENTIONAL CMYK REPRODUCTION WITHOUT METHOD OF INVENTION OUT-OF-REGISTER 0.2 MM (0.008").

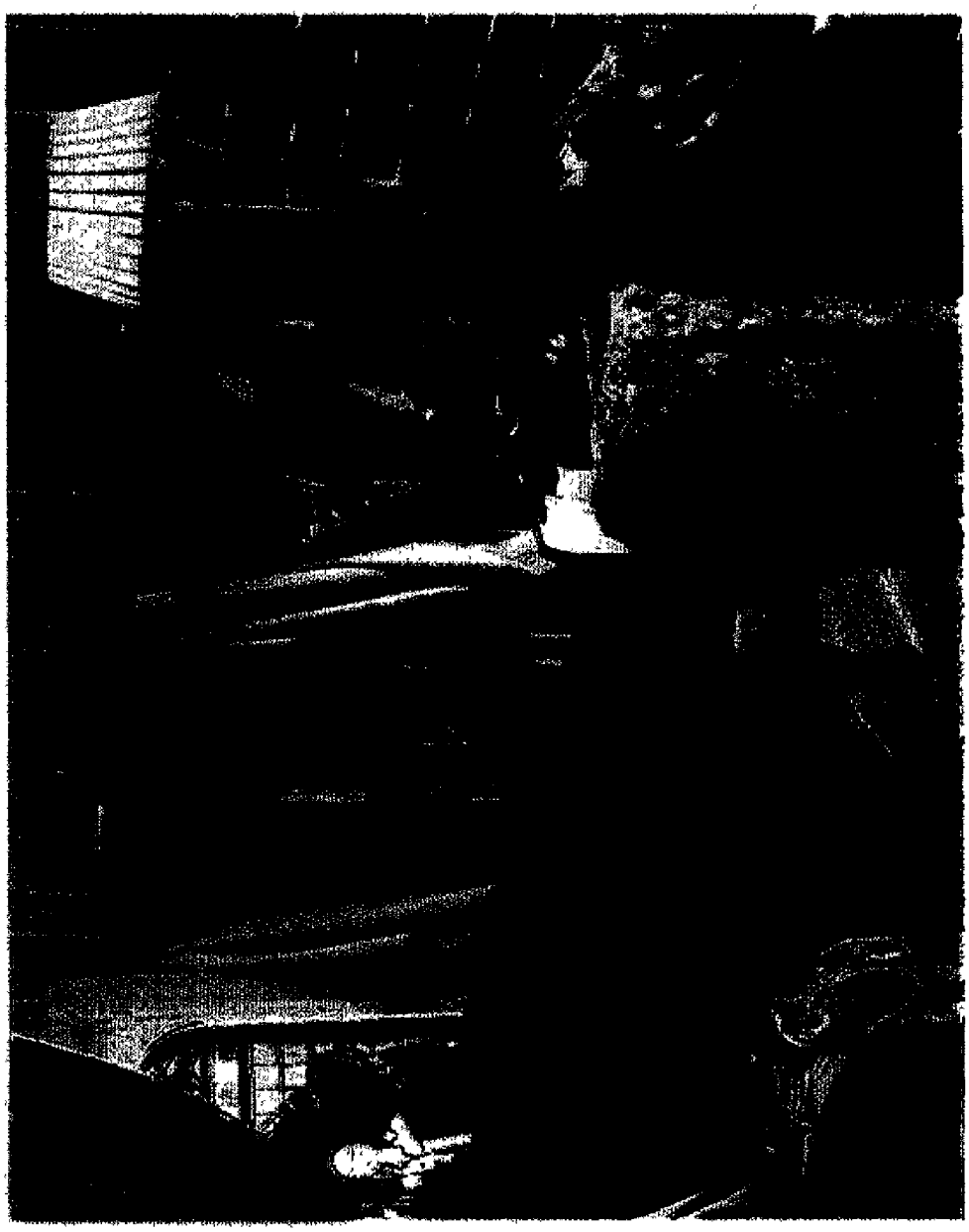
FIG. 25B MODIFIED CMYK REPRODUCTION WITH METHOD OF INVENTION OUT-OF-REGISTER 0.2 MM (0.008").

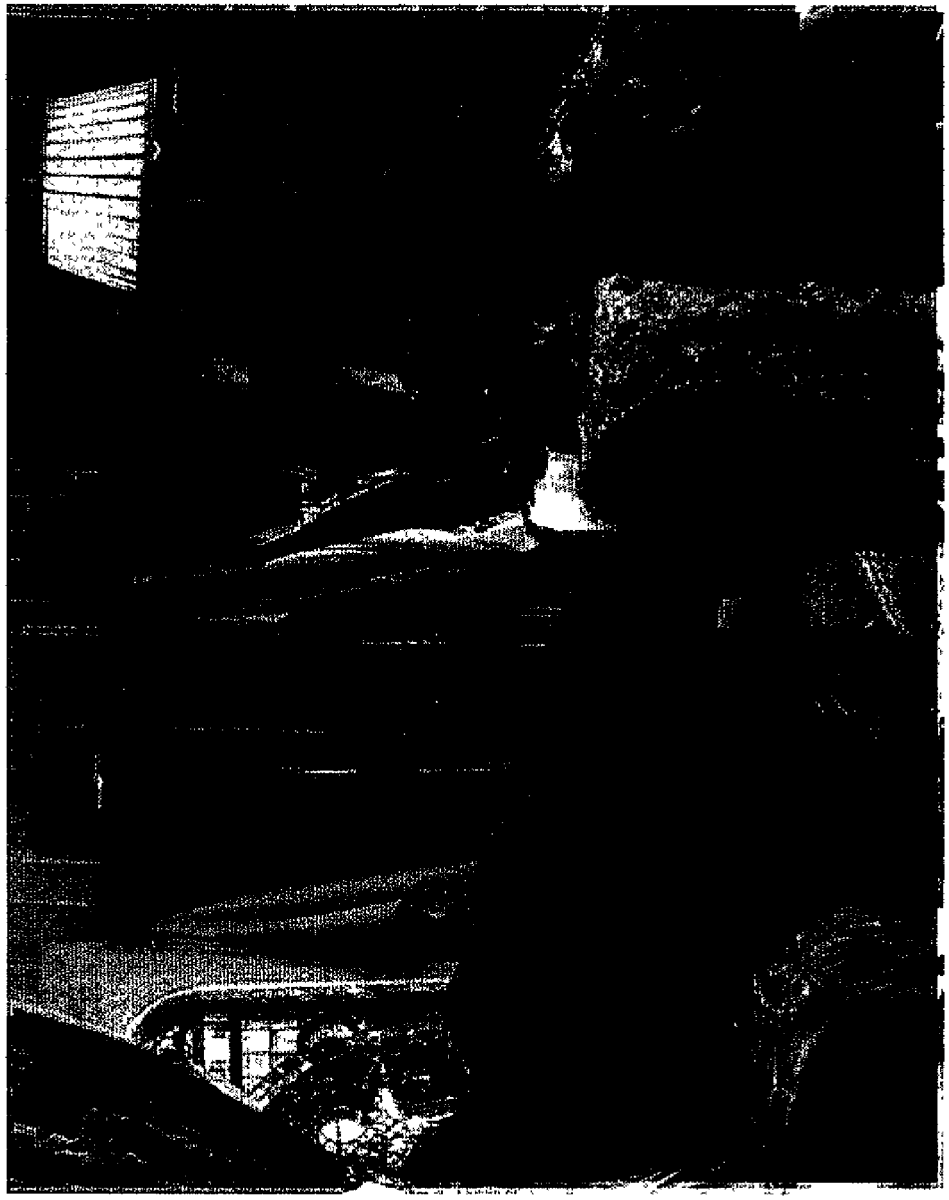
FIG. 26A CONVENTIONAL CMYK REPRODUCTION WITHOUT METHOD OF INVENTION OUT-OF-REGISTER 0.6 MM (0.024").

FIG. 26B MODIFIED CMYK REPRODUCTION WITH METHOD OF INVENTION OUT-OF-REGISTER 0.6 MM (0.024").

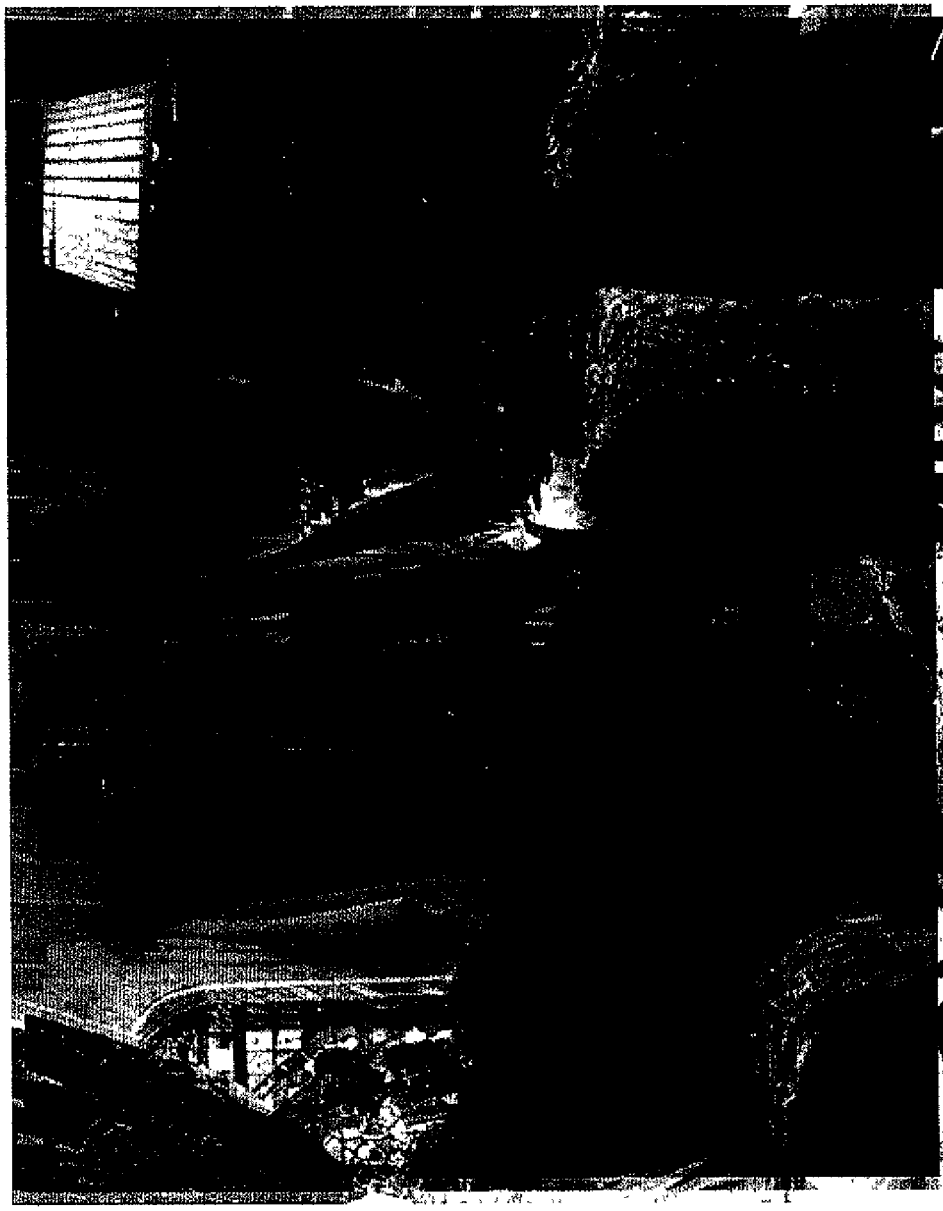
FIG. 27A CONVENTIONAL CMYK REPRODUCTION WITHOUT METHOD OF INVENTION OUT-OF-REGISTER 1.2 MM (0.047").

FIG. 27B MODIFIED CMYK REPRODUCTION WITH METHOD OF INVENTION OUT-OF-REGISTER 1.2 MM (0.047").

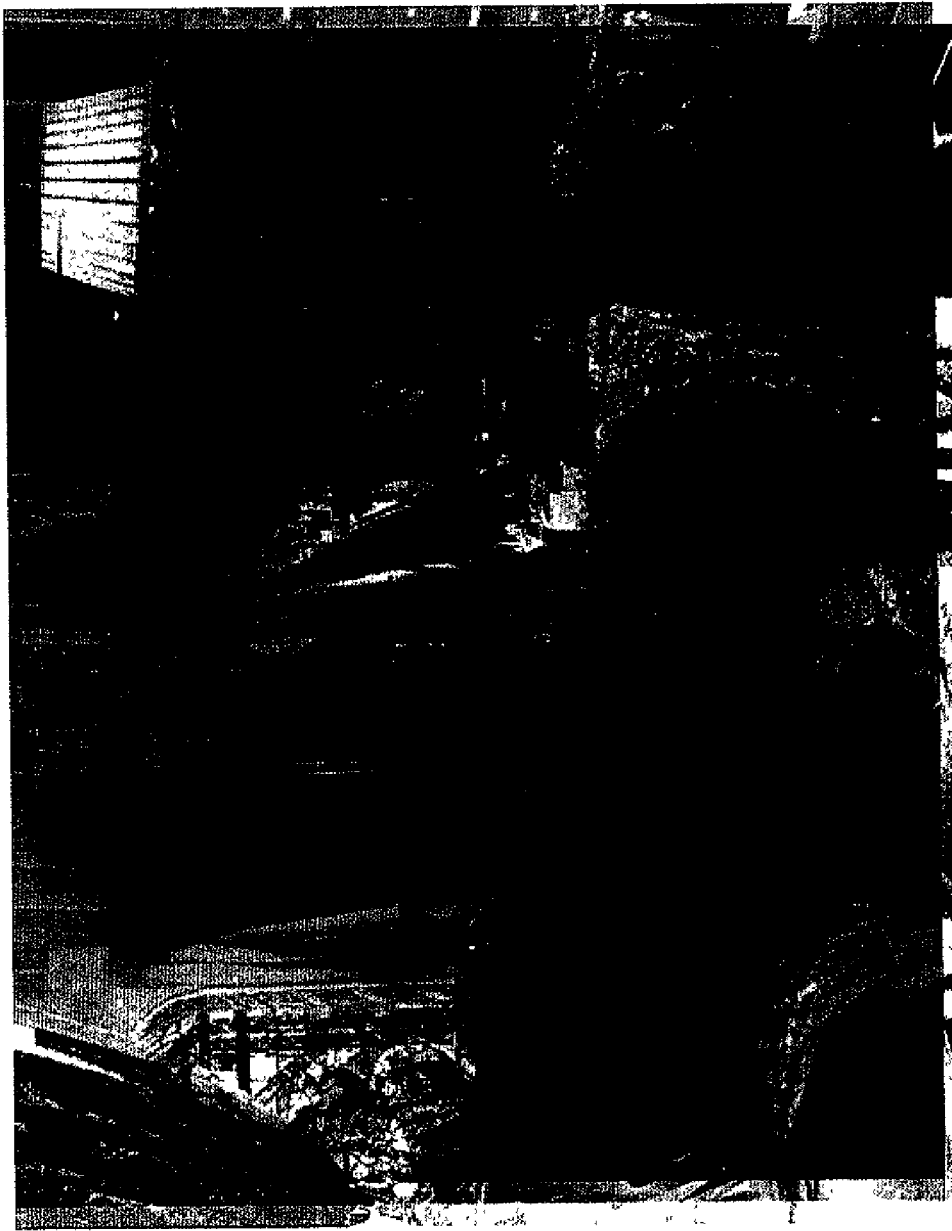
FIG. 28A CONVENTIONAL CMYK REPRODUCTION WITHOUT METHOD OF INVENTION OUT-OF-REGISTER 2 MM (0.08").

FIG. 28B MODIFIED CMYK REPRODUCTION WITH METHOD OF INVENTION OUT-OF-REGISTER 2 MM (0.08").

FOUR-COLOR EXAMPLE OF ENLARGENING THE CMY SEPARATIONS.

GAUSSIAN BLURRING FILTER AT VARYING RADII
APPLIED TO SIMPLE IMAGE.

ORIGINAL GREYSCALE POSITIVE OF YELLOW SEPARATION.

ORIGINAL GREYSCALE POSITIVE OF MAGENTA SEPARATION.

GREYSCALE POSITIVE OF MAGENTA SEPARATION AFTER DENSITY ADJUSTMENT.

GREYSCALE POSITIVE OF MAGENTA SEPARATION AFTER GAUSSIAN BLURRING.

GREYSCALE POSITIVE OF YELLOW SEPARATION AFTER DENSITY ADJUSTMENT.

GREYSCALE POSITIVE OF YELLOW SEPARATION AFTER GAUSSIAN BLURRING.

GREYSCALE POSITIVE OF BLACK SEPARATION AFTER UNSHARP MASKING.

ORIGINAL GREYSCALE POSITIVE OF BLACK SEPARATION.

GREYSCALE POSITIVE OF FIG. 32B AFTER LOCAL PROCESSING OF REGIONS OF INTEREST DELINEATED IN FIG. 35A.

COMPOSITE IMAGE WITH SEPARATIONS SHIFTED IN OTHER DIRECTIONS TO ASSESS PERFORMANCE AND IDENTIFY REGIONS OF INTEREST.

PHASE-TOLERANT OUT-OF-REGISTER IMAGE. SEPARATIONS SHIFTED OPPOSITE TO FIG. 4.

CONVENTIONAL OUT-OF-REGISTER IMAGE. SEPARATIONS SHIFTED OPPOSITE TO FIG. 4.

PHASE-TOLERANT OUT-OF-REGISTER IMAGE
CYAN & MAGENTA SHIFTED VERTICALLY;
YELLOW & BLACK SHIFTED HORIZONTALLY.

CONVENTIONAL OUT-OF-REGISTER IMAGE
CYAN & MAGENTA SHIFTED VERTICALLY;
YELLOW & BLACK SHIFTED HORIZONTALLY.

COLOR SEPARATION METHOD AND PRINTED PRODUCT OF THE METHOD

The present invention is directed to a method of making color separations from an original color image so that an ultimate printed image is tolerant of some misregistration of the individual color printing plates. The invention also encompasses the ultimate printed product made using the method.

BACKGROUND OF THE INVENTION

Color printing by lithography goes back to the early years of the nineteenth century. Multiple stones were used, one for each ink printed, and the print went through the press as many times as there were stones. The problem was then, as it is today, to keep these individual images in proper register. Considerable skill was required on the part of the printer to make sure that each color would be in the correct position and that the overlying colors would merge correctly. The process left much to be desired and up to the middle of the century the highest quality works were colored by hand. High costs severely limited availability of color illustration. The development of a number of photomechanical processes near the turn of the nineteenth century reduced the level of skill needed and greatly expanded the use of printed illustration. Processes such as photolithography, photogravure, photoengraving, and others, allowed the image to be photographically transferred from an original photograph or drawing to a printing plate. These processes initially were useful only for black and white illustration. The later invention of the trichromic halftone process was a major breakthrough in printing color images. Improved photographic films with wide spectral sensitivity allowed the use of individual camera filters which removed all colors except the red, green and blue spectral region of the original. This allowed the preparation of a series of halftone plates that printed the images in complementary cyan, magenta and yellow inks. So-called process printing, using subtractive primary Cyan, Magenta, and Yellow inks, along with blacK ink (CMYK) is now in wide use. While equal amounts of superposed transparent cyan, magenta, and yellow inks would nominally produce black, the result is more often a muddy brown. The separate black ink is used to overcome the spectral impurities of the three subtractive primaries. With standard process printing, four image separations are needed, one for each ink color. A separation is a monotone (grey scale) image that indicates how much of a given color ink needs to be printed at a given location. For higher quality printing where a wider color gamut might be needed, other processes such as Hexachrome® can be used. Hexachrome is a registered trademark of Pantone, Inc., Carlstadt, N.J. This process adds orange and green to the basic CMYK colors. A black separation is also normally used to provide a wider range of image luminance and render better neutral greys and shadow density.

The basic trichromic halftone process remains the standard for both large and small run print reproduction using traditional (non-digital) presses. Keeping the colors in register during printing was an early problem and remains so today.

Common to all color reproduction processes is the need to hold tight register between the various separations. For analog devices using printing plates on a press this is a major problem. Analog processes include those known as gravure, flexography, lithography, screen, and letterpress. In particular, the ability to hold register in the machine direction is generally worse than holding side-to-side register. Even a displacement as small as 0.085 mm (0.003 inch) can produce noticeable unpleasing artifacts that result in an unsatisfactory printed image. This small displacement translates into a single row of halftone dots at a 150 lines per inch screen ruling. The amount of image degradation relates directly to the amount the plates are out of register. Maintaining exact register is a lesser problem for the various digital printing devices, such as ink jet or laser jet printers or short to medium run digital presses. However, the method of the invention applies equally to digital marking technologies.

With conventional color separation technology the resulting image in each of the separations carries both object color and object detail information. This is extremely important to keep in mind. This system is entirely satisfactory for printing when all printing plates can be held in exact register. However, the method suffers badly when any of the plates is out of register. An out of register image can render multiple images of a given object, introduce unwanted edges, unwanted colors, apparent poor image resolution, and other unpleasant artifacts. The printed image gives the viewer an immediate sense that something is wrong.

One widely implemented technique used to minimize the problem of misregistration is called "image trapping". An oversimplified explanation of this might be the situation where a well defined object is seen against a contrasting uniform background. If the area occupied by the object is made a bit larger than the space it would normally occupy (image spreading), the danger of a white edge appearing is reduced if the separations are somewhat misregistered. Alternatively, the background space that the image would occupy can be made somewhat smaller (image choking). Another alternative is to use a heavy border that overlaps the image. In all cases there is overlap of the image border onto the background area. U.S. Pat. No. 6,236,754 describes one somewhat different technique to mask misregistration at object borders.

The effectiveness of various trapping methods is limited since choking and spreading strategies deal primarily with borders between the boundary of a given object and its adjacent background. Details of edges within a given object are not addressed nor are complex images where there is poor separation between object and background. The present invention specifically addresses ways for dealing with edges within a given object field by minimizing or eliminating misregistration artifacts in the printed images.

The conventional solution to holding register of multiple overprinted images is to use complex sensors and feedback control to the printing hardware. This approach is expensive and is often impractical in many applications such as newspapers and corrugated packaging. In the past, quality requirements for these uses have been somewhat less stringent. Competition is now pressing even the low-end color printing applications to improve their quality. The present method now to be described is directed to that end. The method applies equally to those more stringent printing processes where registration error is small.

SUMMARY OF THE INVENTION

The present invention is directed to making color separations for color printing whereby the visual tolerance of color misregistration in the ultimate printed image is significantly increased. The method first requires initial preparation of a plurality of color separations of an original color image. The separations may be made by conventional or other methods. One separation will be black or, in some instances where non-process printing is being considered, it may be a surrogate color separation in lieu of black. An example of a surrogate color separation might be the dominant color providing the most detailed greyscale (luminance information) image in a two color separation using only red and green. Most often the separations will be the conventional cyan, magenta, yellow, and black but the invention is not so limited. In its broadest embodiment, n separations may be made where n is at least 2. The method is also applicable to the processes generally known in the art as Duotone, Tritone, or Quadtone.

All of the separations, other than the black or its surrogate color, are passed through a low pass filter to degrade object (image or scene) detail. This would normally be done by the use of a blurring algorithm; i.e., generally implemented in the spatial domain by using an appropriately sized convolution kernel. The blurring algorithm is typically a Gaussian filter although it is not so restricted. The amount of image degradation or blurring will vary with the particular image; i.e., its size, resolution, content, and anticipated possible misregister. "Content" may relate to either or both scene colors or spatial frequency content. For convenience of description only, the terms "luminosity", "luminance", "black channel", or "black separation" will be synonymous and encompass both black or its possible surrogate color separation. The intent of this separation is to encode as much as possible the luminance content of the image. Similarly, printer's terminology of "misregister" should be considered as equivalent to the signal processing term "image phase error". Both refer to the spatial shift of a given separation. Also, the terms "separation" and "channel" should be considered as equivalent. As examples, image channels can be Red, Green, and Blue (RGB additive space) or Cyan, Magenta, Yellow, and blacK (CMYK subtractive space). Each of the ROB channels encodes the greyscale intensity of a colored pixel in terms of its red, green and blue component values. CMYK channels (or separations) encode for each pixel the amount of inks of given colors needed to render the desired pixel color.

Object detail is maintained, or preferably even enhanced, in the black image separation by the use of a high pass filter, such as a traditional unsharp mask or other image sharpening filters. All of the separations are then used in the normal manner for preparation of printing plates. Object blurring in the color separations is not restricted to global blurring; i.e. blurring of the entire image. It may also be done locally in some particular region of interest, depending on scene content. Surprisingly, the recombined images are remarkably tolerant of misregistration. The unwanted sharp edges, white object borders, multiple images displaced from each other, or odd colors seen in the usual misregistered prints, are not present. Some minor halos may be noticed along object edges but these do not command the viewer's attention and are normally not objectionable or not even noticed.

The method does not claim to reproduce color with complete accuracy. However, it does essentially preserve the basic hues and luminosity found in the source image. It yields a pleasing natural-looking image that minimizes or eliminates the obvious undesirable artifacts associated with out of register images.

The terms "high pass" or "high frequency detail" and "low pass" or "low frequency detail" can be explained by the use of an analogy. A close-up view of a lawn distinctly reveals every blade of grass within the visual field of the viewer. The viewer is here seeing high frequency; i.e., much detail. However, a lawn seen from a distance appears as a uniform field of green. This would be an example of low frequency, lacking detail. Looking at the close up view through a low pass filter would remove some or all of the fine detail of the individual grass blades. It would be similar to looking at the image through blurry eyeglasses.

The usual practice of the invention initially comprises supplying a red, green, and blue (RGB) encoded image by any known method. This should be digitally encoded for further processing and may be adjusted, as necessary, for contrast, tonal value, brightness, and color balance. The RGB image may have color inaccuracies introduced by the image processing device; e.g. a scanner or digital camera. These inaccuracies are typically corrected by an internal color lookup table that converts them into device independent color units. Units are most usually Commission Internationale d'Eclairage (CIE) L*a*b*, or XYZ color descriptions, the first being the most common. For convenience of description the assumption will be made here that CIE L*a*b* units are used, although the invention is not so limited. Any system that can associate device dependent RGB or CMYK colors into device-independent color units will be satisfactory, as this is the fundamental tenet behind a color managed workflow. Image processing may be done using any of the various software packages available. One is the widely used Adobe Photoshop®, available form Adobe Systems, San Jose, Calif. Others examples that might be noted are QuarkXPress™, available form Quark, Inc., Denver Colo., CorelDRAW® and other packages available from Corel Corp, Ottawa Ontario; and Paint Shop Pro, a shareware program available on the Internet. Without intending to endorse any one of these or other programs that might be available, the method to be outlined in the following description uses Adobe Photoshop®, Version 6.0, for image processing.

Assuming that a conventional four color separation is to be made, the initial 8 or 16 bit encoded digital image in red, green and blue is converted by a mode change to cyan, magenta, yellow and black (CMYK) encoding using conventional lookup table methods. This operation re-expresses the original image encoded in RGB units (0-255 or 0-65,535 levels of grey per channel depending on whether 8 or 16 bit encoding is used) into CMYK units (0-100%). It yields four separate greyscale separations of the source image to be later printed in cyan, magenta, yellow and black inks. Images for the three separations that will be ultimately printed as cyan, magenta, and yellow are then processed with an appropriate low pass filter, such as a Gaussian convolution kernel, to degrade or attenuate varying amounts of image detail. Most preferably, the black separation will be sharpened using an appropriate high pass filter such as an unsharp masking or edge enhancement algorithm designed to amplify high spatial frequencies, although this is not essential to the practice of the invention. Stated differently, detail is removed from each of the three color separations and may be enhanced in the black separation. The black or luminance channel; e.g., CIE L*, will carry the achromatic information from the original. This channel carries all of the broadband detail in the image. Because luminance is an achromatic representation of the original color image, this channel contains detail from all parts of the visible spectrum. Therefore, it is not color band limited. Appropriate printing plates are then produced for ultimate rendition of the image.

It is not essential to the invention for a four color separation to be used nor is it essential that the ultimate printed image use process cyan, magenta, or yellow inks. It is entirely suitable in some situations to use only two separations; e.g., red and black, green and black, or red and green.

Unlike conventional color separation where image detail is present in all channels, the method of the present invention requires only one channel to carry the image detail. Consequently, the need for higher spatial frequencies (or detail) in the remaining separations is unnecessary. Carrying image detail in these channels would be redundant. More importantly, retaining high spatial frequencies (detail) in these remaining channels would produce image artifacts should the printing plates go out of register. One of the n color separations is designated as the luminance channel. This channel is an achromatic representation of the source image. When n is equal to or greater than 4 under either process printing or higher order printing architectures, the usual choice is to assign luminance to the black separation. When n is only 2 or 3 separations, there is greater latitude as to which of the separations to choose to encode luminance. As an example, in current practice with a typical two ink red-green architecture, usually both separations combine to render luminance since overprints of each ink are needed to generate a black surrogate. In contrast, when using the method of the present invention, the color channel which is seen visually to carry the most important luminance information assumes the role of the surrogate black separation. With a typical three ink scenario, the third color is often black and the black separation becomes the natural choice. However, if black is not one of the three inks to be used, the color separation which carries the bulk of the image luminance is selected, as was the case with the two color example. Usually this will also imply that the darkest ink of the three would be designated as the surrogate black channel. Since the method of the present invention rests on conveying luminance content through only one channel, it is important that essential details of the source image appear in this separation. A visual comparison between the candidate luminance channel and the L* channel of the original image provides an excellent method for identifying the best selection.

The method of the invention can be applied to conventional color separations that employ either grey component replacement, under color removal, under color addition, or combinations of these known techniques. However, better results would be expected if the black model was derived from a pixel's device independent luminance value; e.g. its CIE L* lightness. Since the complement of lightness is darkness, then 100-L*, or some functional variation of this parameter, can be used to encode a pixel's darkness based on the empirical relationship between screened black ink densities and 100-L*.

An L*-like encoding leads, in principle, to a robust separation that enables carrying as much of the detail with the least expensive ink (black) and reducing the amounts of the required but more expensive colored process inks. It should be noted that while the black or luminosity separation can be generated from the L* channel, this method of black generation, while similar to grey component replacement, is not necessarily equivalent. By using the L* channel to encode the black separation, one does not now need to reproduce greys with precise ratios of cyan, magenta, and yellow inks as is usually done with conventional separation techniques. An L* encoded black separation preserves the tonal scale and image lightness of the original since the lightness channel captures the luminance content of the original.

With conventional CMYK process printing, as many as four superposed inks might be applied to render the color of a given halftone dot. This practice requires that all four ink planes be in perfect register to render the color properly. One optional advantage of the present method is that a fewer number of inks may be used to achieve a satisfactory color rendition. If the number of ink planes can be minimized, this effectively reduces the ink's misregistration degrees of freedom at the time of printing. By printing with fewer inks, the penalty for an ink plane being out of register is reduced. It has been found that with process printing, the color of a pixel can be satisfactorily reproduced with at most three inks; e.g., black and two process primaries. Such an approach yields bright and clean colors. The use of a fewer number of inks may somewhat reduce the shadow and black densities one might achieve on blacks using four colors. However, this is a small price to pay when the need for registration tolerant printing may be more critical than achieving high print density.

It is a principal object of the present invention to provide a method of color separation that is visually tolerant of misregistration in the ultimate printed image.

It is a further object to provide a method of color separation that may be used with readily available software for preparing the separations.

It is another object to provide a method of color separation that may be used with as few as two colors of ink yet provide a printed image tolerant of misregistration.

It is yet an object to provide a color separation method that is not limited to the use of standard process inks.

It is also an object to provide a method of printing an image that does not require the use of all three subtractive color primary process inks.

It is an important object to provide a printed color image that is visually acceptable despite some misregistration of the printing plates.

These and many other objects will become readily apparent to those skilled in the art upon reading the following detailed description when taken in conjunction with the drawings.

BRIEF DESCRIPTION OF THE DRAWINGS

This patent or application file contains at least one drawing executed in color. Copies of this patent or patent application publication with color drawings will be provided by the Office upon request and payment of the necessary fee.

FIGS. 24A and 24B show respectively a CMYK still life image in register and a CMYK image in register but modified as in FIG. 17.

FIGS. 25A to 28B show the image of FIG. 25A with increasing color misregistration as it would appear comparing conventional printing technology with that using the method of the invention.

FIGS. 36A and 361B respectively illustrate a conventionally separated out-of-register image with one made using the present method where separations were shifted opposite to those of FIG. 4.

DETAILED DESCRIPTION OF THE PREFERRED EMBODIMENTS

The method of invention exploits the unique characteristics of the human visual system. A brief review of the human visual system, specifically the acuity characteristics of black & white (luminance) and color vision (chrominance), is useful to understanding the present invention. A large body of literature in the field of vision research has shown that contrast sensitivity to luminance and chrominance are considerably different. Objects can be better distinguished from each other or their background, if the difference in luminance or chrominance is large. Of these two factors, however, luminance plays the most important role. Furthermore, it isn't the absolute difference in luminance, which matters but the relative difference. Like most imaging systems, the human visual system attenuates (reduces) image contrast while removing (filtering out) high spatial frequencies in a scene. The term "contrast" is defined as the difference between two luminances divided by their sum. Objects that have small contrast with respect to their background are difficult to distinguish. The reciprocal of the minimum contrast needed for detection of an object is referred to as "contrast sensitivity". Just as temporal frequency refers to how rapidly a signal is vibrating or oscillating with time, i.e. cycles per second, the term "spatial frequency" refers to how an optical signal is varying with distance, i.e. the contrast of a black and white signal in space. Spatial frequency is measured in cycles per mm or equivalently, cycles per degree (cpd) of viewing angle, a viewing-distance independent relative measure.

Figure 1:
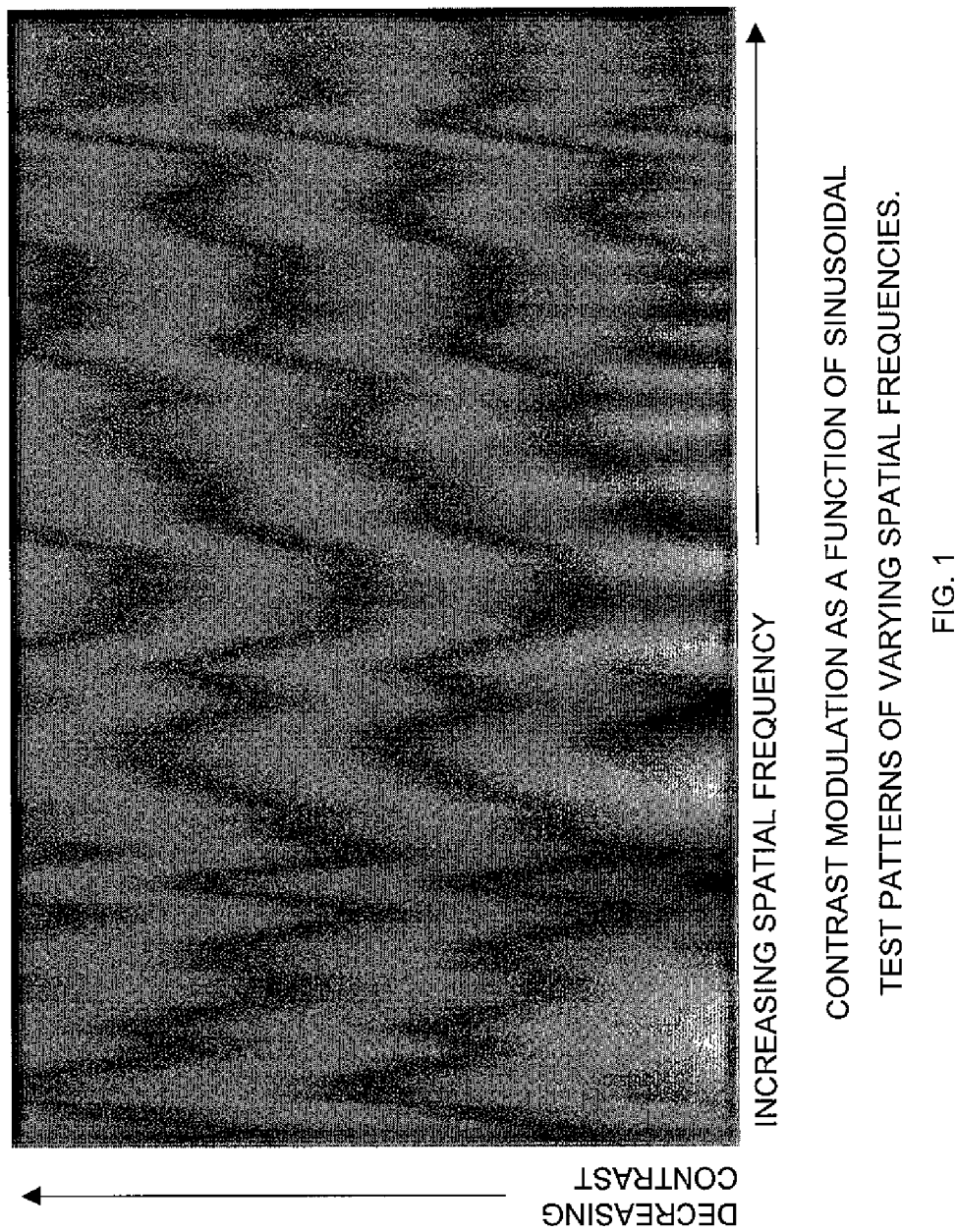
FIG. 1 is an illustration of contrast modulation as a function of sinusoidal test patterns of varying spatial frequencies.

Investigations of the contrast sensitivity of the human visual system are typically done using test patterns. Typically, sinusoidal patterns are used, as illustrated in FIG. 1. For a sinusoidal luminance pattern, contrast is defined as the amplitude of the black and white sinusoidal variation divided by its average luminance (mean greyness). This expression is often called "modulation depth" or simply "modulation". The minimum modulation required for the detection of this pattern is referred to as the "modulation threshold". By modulating sinusoidal gratings of varying spatial frequencies (as shown in FIG. 1) and recording what the modulation threshold is at each frequency, the contrast sensitivity function or its equivalent, the modulation transfer function can be determined. Knowledge of the contrast sensitivity function or modulation transfer function is vital in that it not only fully characterizes, but determines the performance and capabilities of the human visual system.

Figure 2:
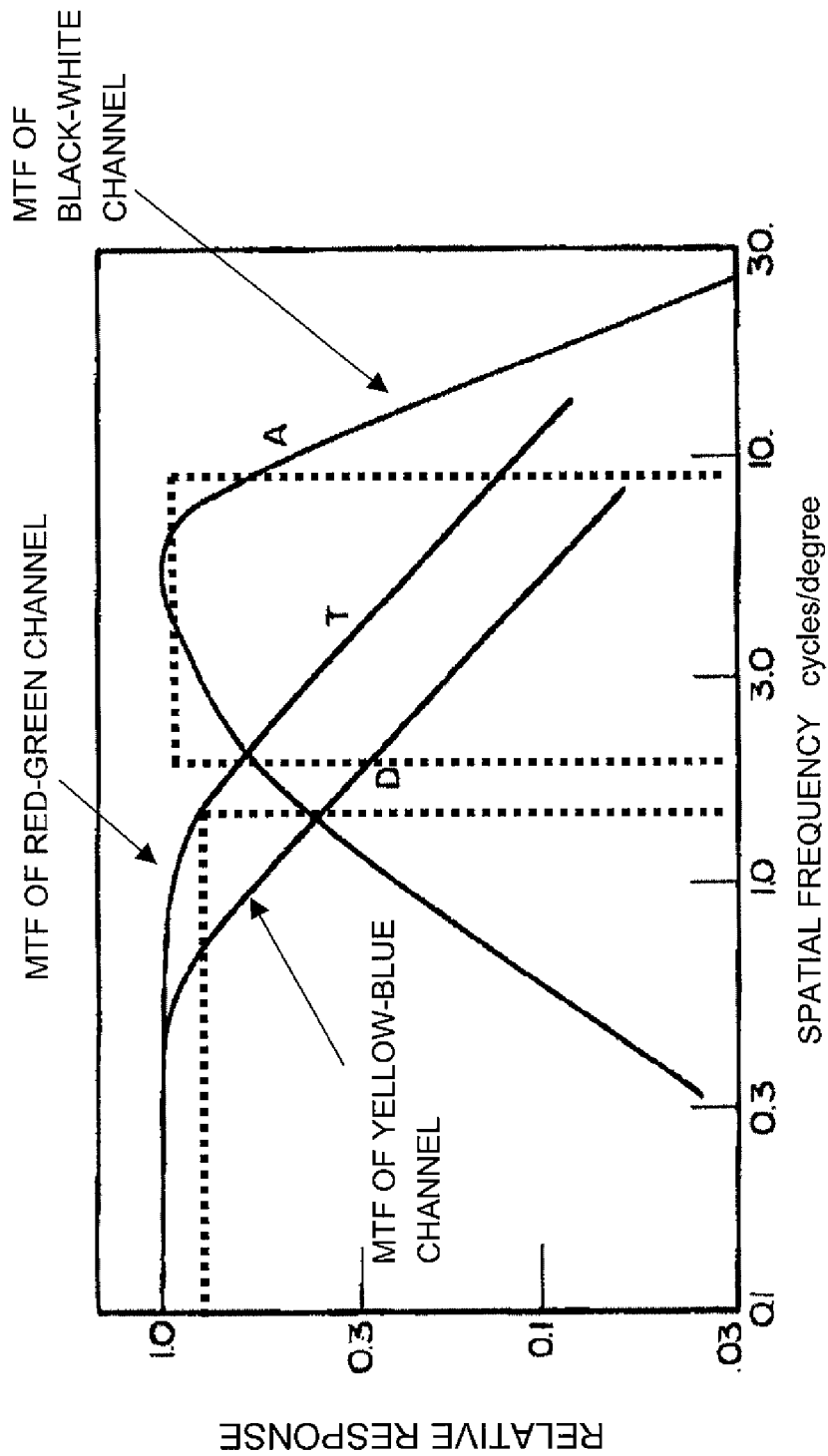
FIG. 2 is a plot of the chromaticity and luminosity modulation transfer functions of the human visual system.

FIG. 2 is a plot of Granger's chromaticity and luminance modulation transfer functions for the human visual system (Edward Maurice Granger, Ph.D. Dissertation, *Specification of Color Image Quality*, University of Rochester (NY), 1974). The modulation transfer function of the black and white channel (curve labeled "A") which characterizes luminance acuity is essentially band pass (dashed box). This pass band is only about two-octaves wide, ranging roughly between 2-8 cycles per degree (cpd) of viewing angle. The modulation transfer functions for the red-green and yellow-blue opponent channels (labeled "T" and "D", respectively) characterize the human visual systems chrominance acuity. Chrominance acuity can be modeled as low pass (dashed box). While red-green acuity is slightly more sensitive to high spatial frequencies than yellow-blue, the difference is small. In essence, the cutoff frequency for chrominance acuity is roughly one cpd and there is little significant frequency overlap between the chrominance and luminance modulation transfer functions. From FIG. 2 it is evident that chromatic frequencies beyond the cutoff frequency of 1 cpd cannot be seen. However, achromatic frequencies above 1 cpd are perceptible. Given this processing dichotomy, the removal or absence of high spatial frequencies in the chrominance channels should not be readily discernable to the human eye provided the luminance channel conveys the full spatial frequency content of the original image. In other words, one can filter the frequency content of an image's luminance channel to correspond to the band-pass characteristics of the human visual systems luminance modulation transfer function. The same can be done with the frequency content in the chrominance channels to correspond to the low-pass characteristics of the chrominance modulation transfer functions.

The method of invention attempts to exploit this unique characteristic of the human visual system in the following manner:

(a) by designating a specific ink color separation to serve as the luminance channel;

(b) encoding the designated luminance channel with wide band spatial frequencies;

(c) preferably accentuating the luminance channel's high spatial frequencies to amplify detail;

(d) designating the remaining ink separations to serve as chrominance channels; and (e) digital filtering to remove the mid to high spatial frequencies in each of the chrominance channels so that they convey only narrow band, low-frequency content.

By properly filtering the appropriate channels according to the human visual system's luminance and chrominance bandwidth characteristics, and then assembling a composite image, the image has been found to appear approximately the same as a reproduction made using conventional separation methods; i.e. without filtering. The theoretical foundation of the method of invention requires the separation of a color image's spatial frequency content into two parts. A chromatic component consists of only low spatial frequency content (narrow band). A corresponding luminance component consists of the full spatial frequency content (wide band).

Figure 3:
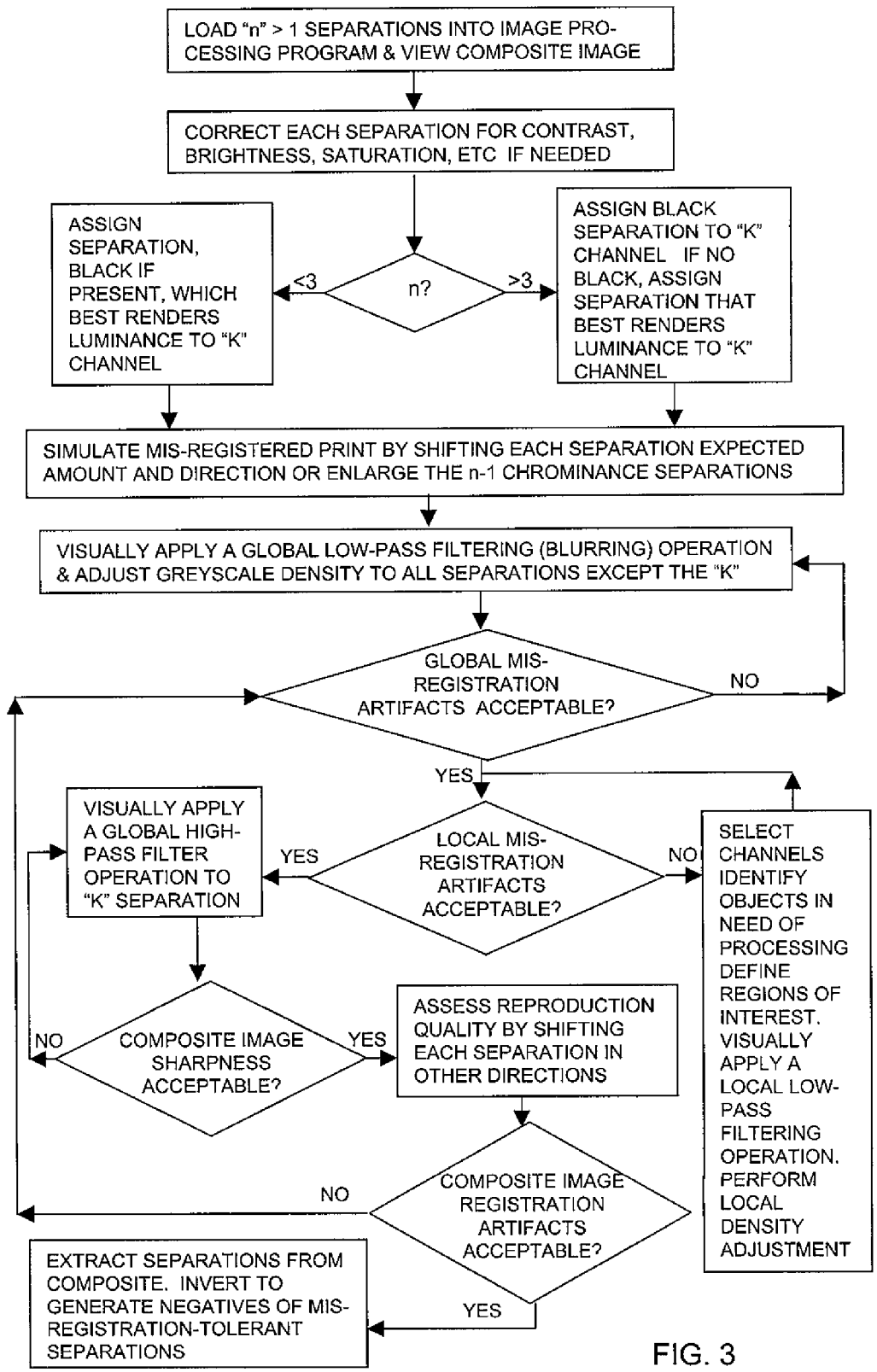
FIG. 3 is a flow sheet detailing the method of the invention.

FIG. 3 is a flow chart summarizing the basic steps for generating misregistration tolerant ink separations for color print reproduction. The flow chart illustrates the paths taken for two color, three color, and four or more color printing. In the examples that follow, reproductions of out-of-register images using conventional printing techniques have been simulated to demonstrate the method of invention. Reproductions of misregistered prints were done entirely within Adobe Photoshop® by shifting the various ink separations some physical amount in a specified direction. The resulting composite then yields an image resembling what would actually be rendered on press. The prints comprising the figures in this application were made by sending the various composite images to a standard (CMYK) color laser printer. In an actual printing environment, after implementation of the method of the invention, separations are halftone screened, the printing plates are generated, and subsequent workflow is conventional. The printing plates are mounted on the press and the job is run as would be any other print job.

The misregistration tolerant generation process begins with a source image. This is generally a natural, complex image in raster format although vector-based images that have ultimately been rasterized would also be suitable. For the sake of clarity, the method of invention has been demonstrated using difficult to reproduce images under conditions of severe misregister. The source image can be encoded in either CIE $L^*a^*b^*$, RGB, or CMYK. For simplicity of explanation it is presumed to be RGB since this mode has become the de facto standard for image coding and exchange. To apply the method of invention, an image processing program that is capable of displaying and performing standard image processing operations on individual channels as well as on the composite image is necessary. While not intended to be an endorsement of one product over others that are available and equally suitable, Adobe Photoshop®, Version 6, has been used throughout to demonstrate the method of invention on selected images. It is also assumed that the source image has been corrected, if necessary, for contrast, brightness, saturation, color cast, and any other properties.

The method to be described assumes that one begins with a source image already separated or one that can be separated in one of the following four ways:

(a) an RGB encoded image separated for five or more inks; e.g., to CMYKabc using International Color Consortium (ICC) profiles or other empirical or model-based separation methods with CMYK process inks and ink colors "a", "b", "c";

(b) an RGB encoded image separated for four-color process printing, i.e. to CMYK using ICC profiles or other empirical or model-based separation methods;

(c) an RGB encoded image separated for two and three-color, non-process printing, using ICC profiles or other empirical or model-based separation methods to be printed with process as well as non-process inks; or (d) an RGB encoded image separated for traditional two (Duotone), three (Tritone) or four-color (Quadtone) printing using commercial or other available separation methods.

Figure 4B:
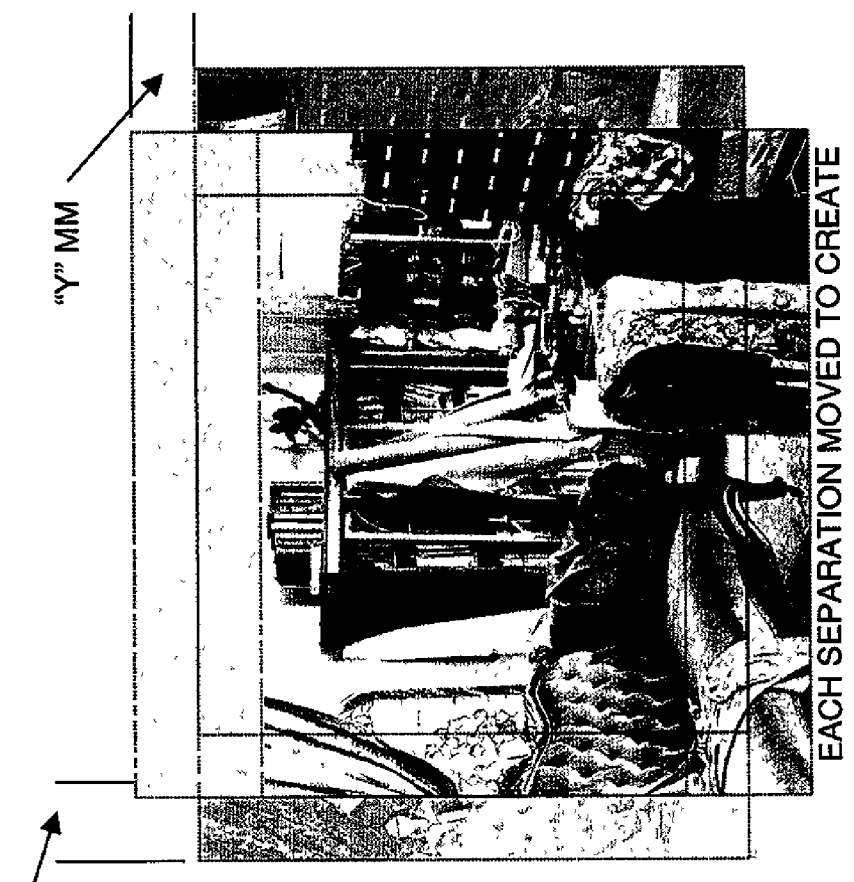
FIGS. 4A and 4B illustrate the direction and amounts reproductions were shifted to simulate misregister.
Figure 4A:

FIG. 4 illustrates how out-of-register images were simulated in Photoshop. For all the illustrations in this paper, we have arbitrarily shifted each separation in one of the four cardinal directions by some specified but equal amount. Cyan has been shifted to the left, yellow upward, magenta to the right, and black downward. As seen in FIG. 4, to better illustrate the method of invention, relatively large registration errors were chosen. Ink separations in images given in FIGS. 5-23 were shifted 2.5 mm or 1/10". For a given orientation, this translates into a 5 mm phase error between any two opposing plates. While this amount is extreme and not usually encountered in most commercial printing processes, a misregister of this magnitude is not uncommon when direct printing on corrugated packages (typically using flexography). As will be explained later, if press registration error can be held to close tolerances, then the degree of image filtering needed would be less. However, the principles disclosed would still apply for generating registration tolerant ink separations regardless of size of phase error.

Given a source image as just described, the next step is to determine which of the "n" separations should be designated as the "luminance" (L*) channel. If n=2 or n=3, then the ink separation which conveys the greatest amount of image information should be selected as the luminance channel. This is usually the darkest color; i.e., the ink with least lightness. When n=2 with red and green inks, most usually the green separation would be designated the luminance channel and the red separation would carry chrominance information. The red separation would then be blurred to remove image detail while the green would preferably be sharpened to accentuate detail.

FIGS. 5-9 show the simplest case where n=2, using red and green inks. FIGS. 5A and 5B show the original as a standard CMYK four color reproduction in and out of printing alignment. In the out-of-alignment images, the separations were shifted 2.5 mm in a given direction. FIGS. 6A and 6B similarly show the same image as a standard two color red-green reproduction in and out of register; e.g., red down 2.5 mm and left 2.5 mm relative to the green. FIGS. 7A and 7B illustrate the two color image in and out of register using the method of the present invention. The surprising improvement obtained using the technique of the present invention on equally out-of-register prints can be immediately seen by comparing FIGS. 6B and 7B.

Figure 5A:
FIGS. 5A and 5B show respectively a four color CMYK image in and out of register as it would look using conventional printing technology.
Figure 5B:
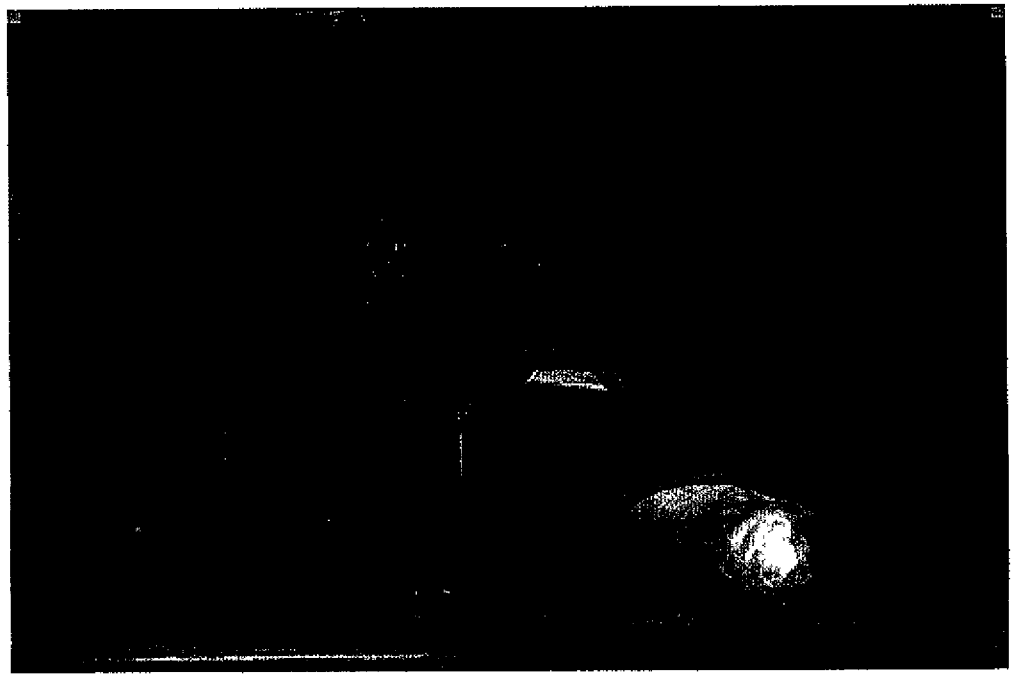
Figure 6A:
FIGS. 6A and 6B show respectively the image of FIG. 5 as a two color red-green reproduction in and out of register as it would look using conventional printing technology.
Figure 6B:
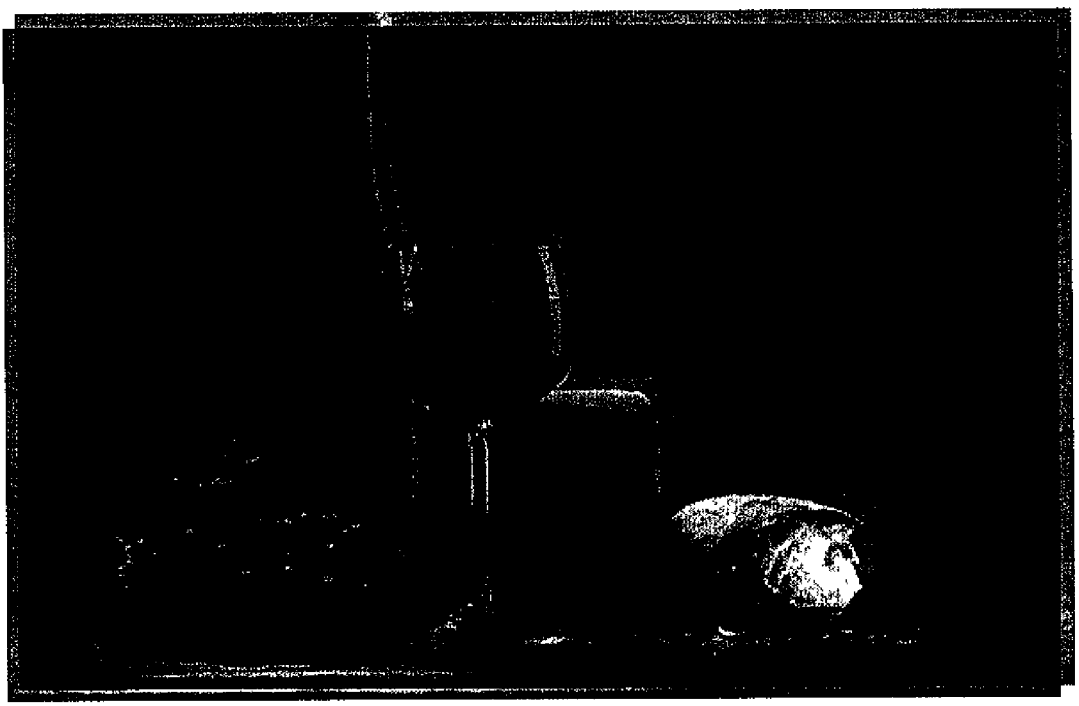
Figure 7A:
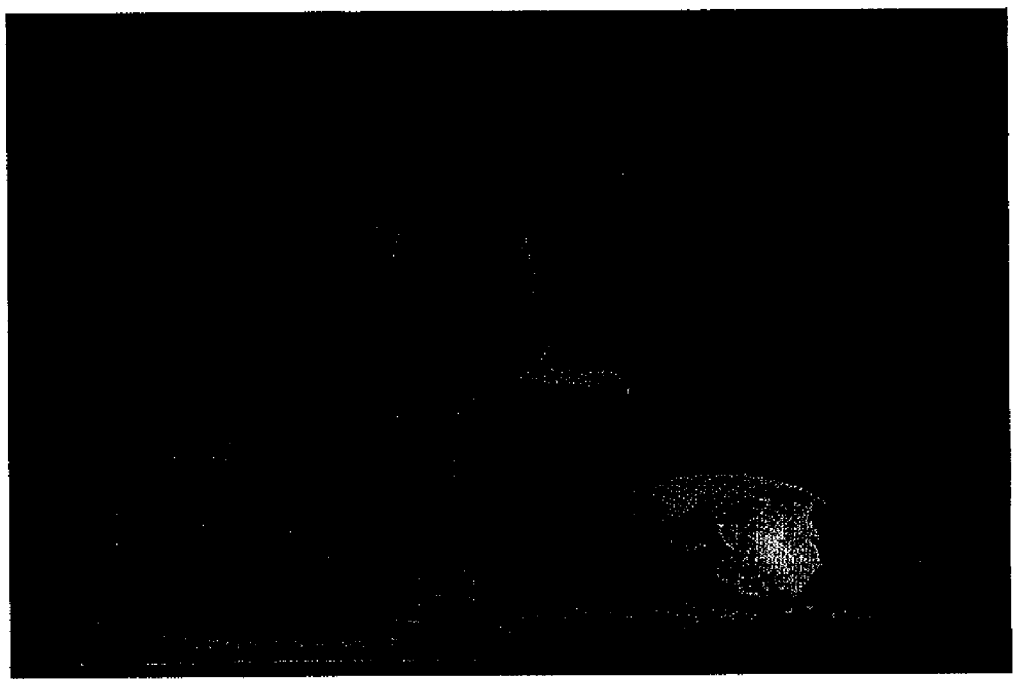
FIGS. 7A and 7B show respectively the image of FIG. 5 as a two color red-green reproduction in and out of register using the methods of the present invention.
Figure 7B:
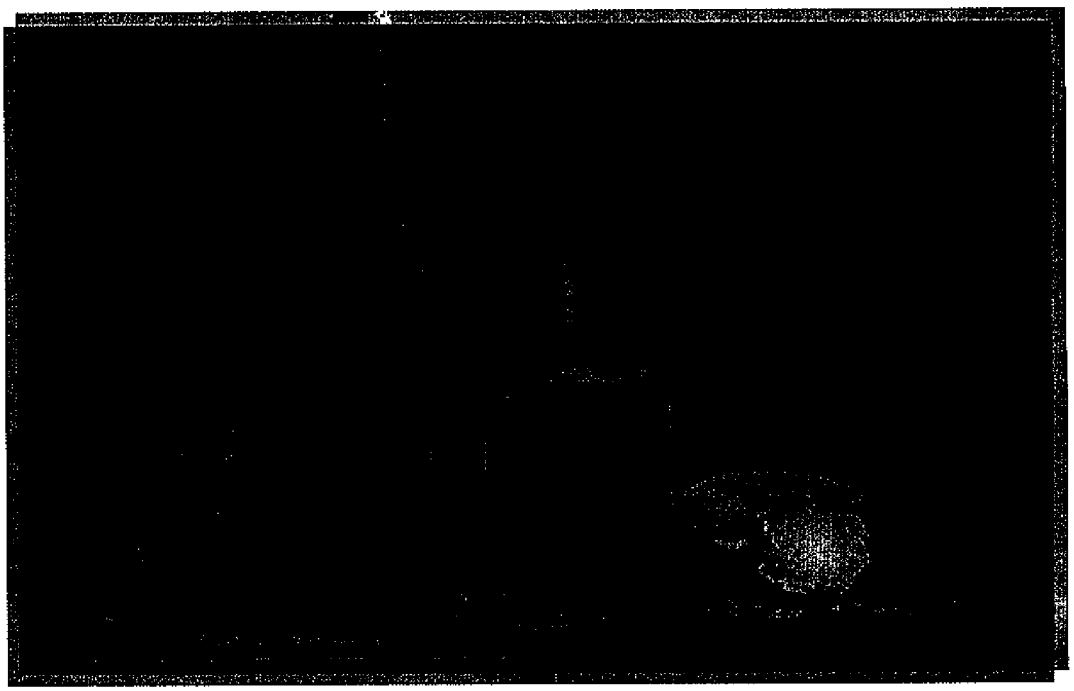
Figure 8A:
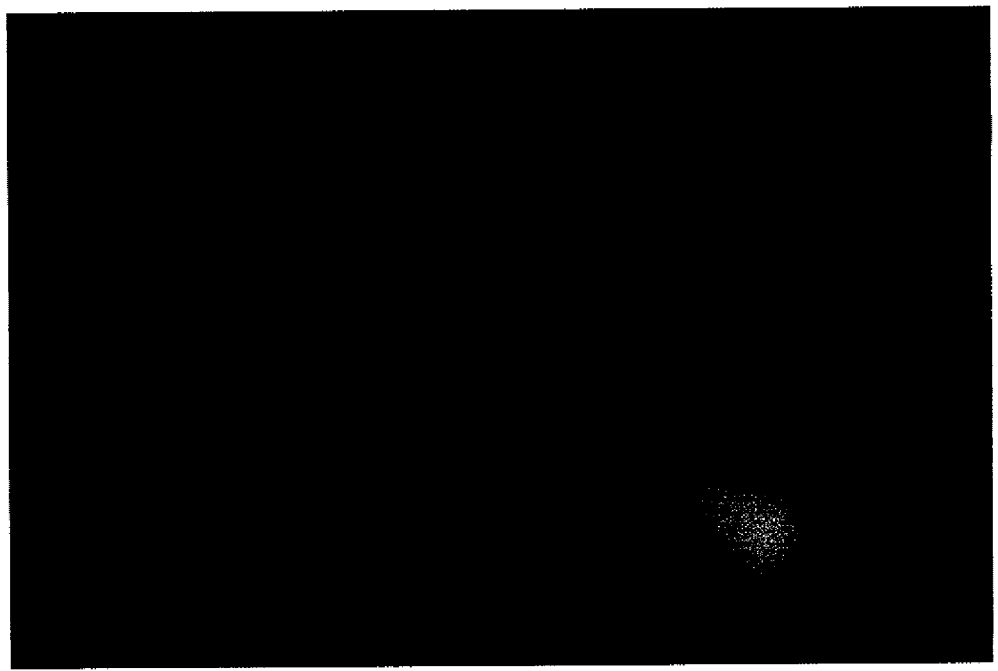
FIGS. 8A and 8B show respectively the image of FIG. 5 as a greyscale positive of the red ink separation with and without the method of the present invention.
Figure 8B:
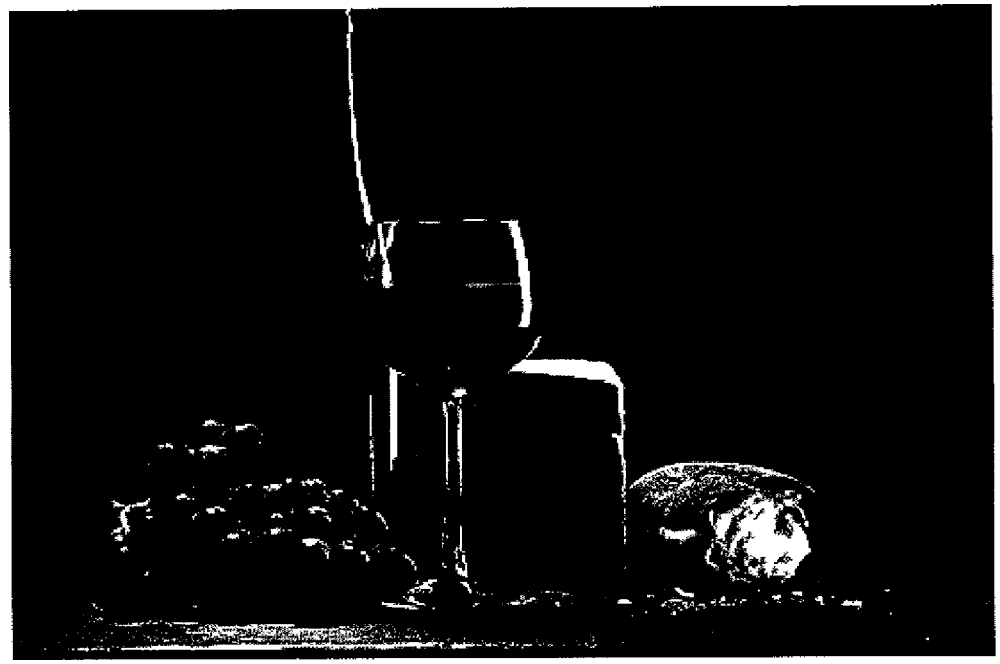
Figure 9A:
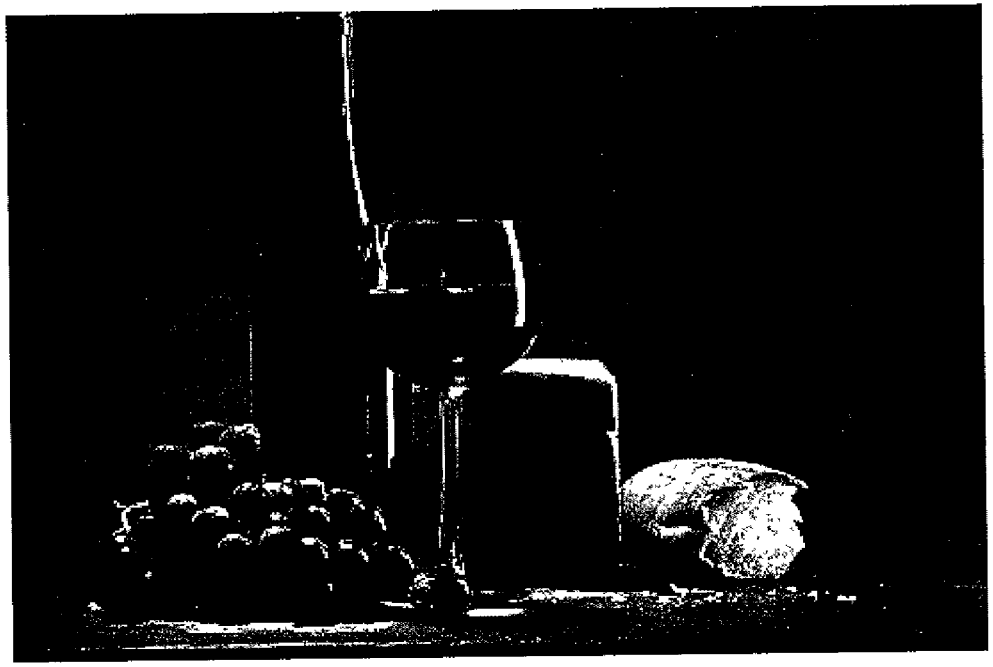
FIGS. 9A and 9B show respectively the image of FIG. 5 as a greyscale positive of the green ink separation with and without the method of the present invention, as it would look using conventional printing technology.
Figure 9B:
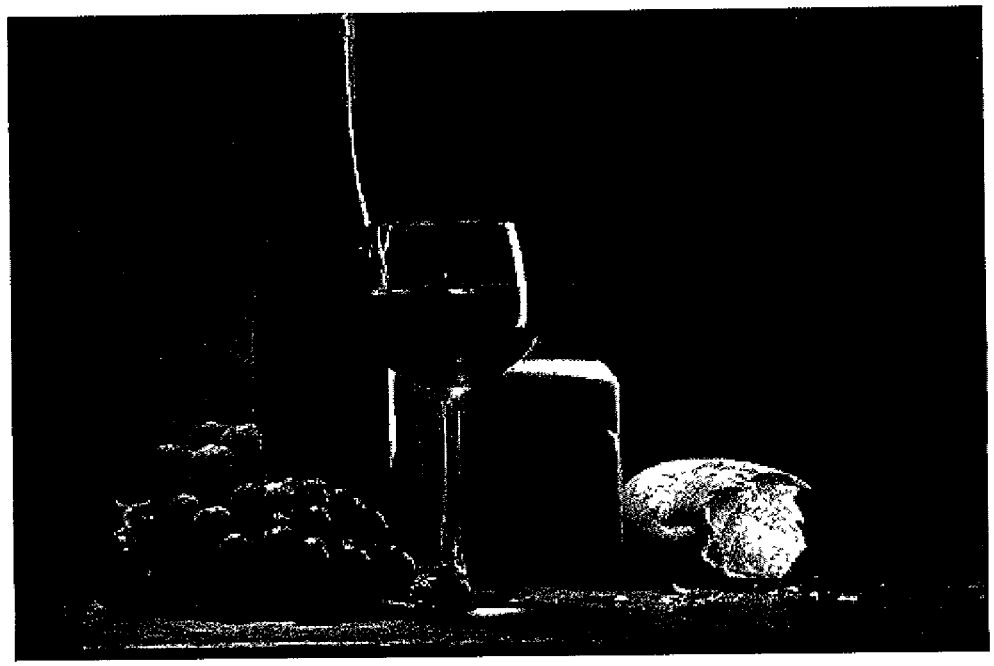
Figure 10B:
FIGS. 10A and 10B show respectively a portrait as a four color original in and out of register.
Figure 10A:

Side-by-side visual inspection of each separation (greyscale image) compared to its composite original (color image) and also the L* channel representing the original is the preferred method for determining which separation to select for conveying luminance. Key to this evaluation is ensuring that all objects and all or most of the details for each object are present in the candidate luminance separation. Not surprisingly, the ink separation which best conveys luminance is generally the one which most closely mimics the behavior of the lightness channel, CIE L*. Examination of the greyscale images of FIGS. 5B and 9B illustrate this concept. White both the initial red and green separations render overall scene luminance, it is the green separation which clearly provides the greatest detail in such objects as the grapes, cheese, and wine glass. It is for these reasons the green separation is selected for luminance even though its solid ink density is a bit lower than the red. The greyscale positives of the processed and conventional separations for the red channel appear in FIGS. 5A and 5B. Similarly, the respective green channel positives are seen in FIGS. 9A and 9B, respectively. It is immediately evident that no high frequency content is present in FIG. 8A. FIG. 9A carries the image detail. Yet surprisingly, the two-color composite image (FIG. 7B) yields an astonishingly crisp and realistic reproduction that is remarkably independent of misregister.

Figure 13B:
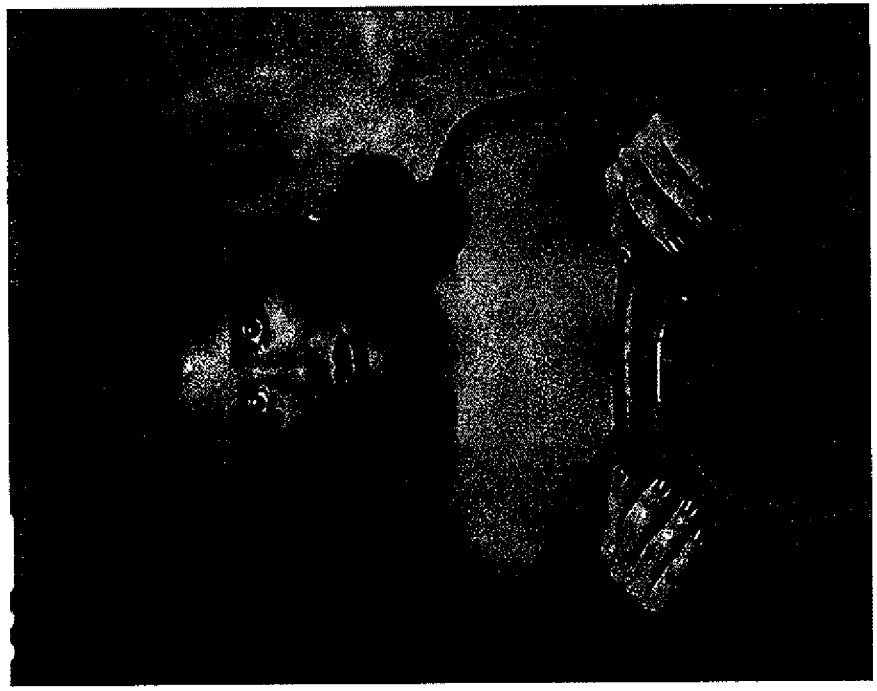
FIGS. 13A and 13B show respectively the image of FIG. 11 as greyscale positives of the magenta separation using the method of the invention and conventional technology.
Figure 13A:
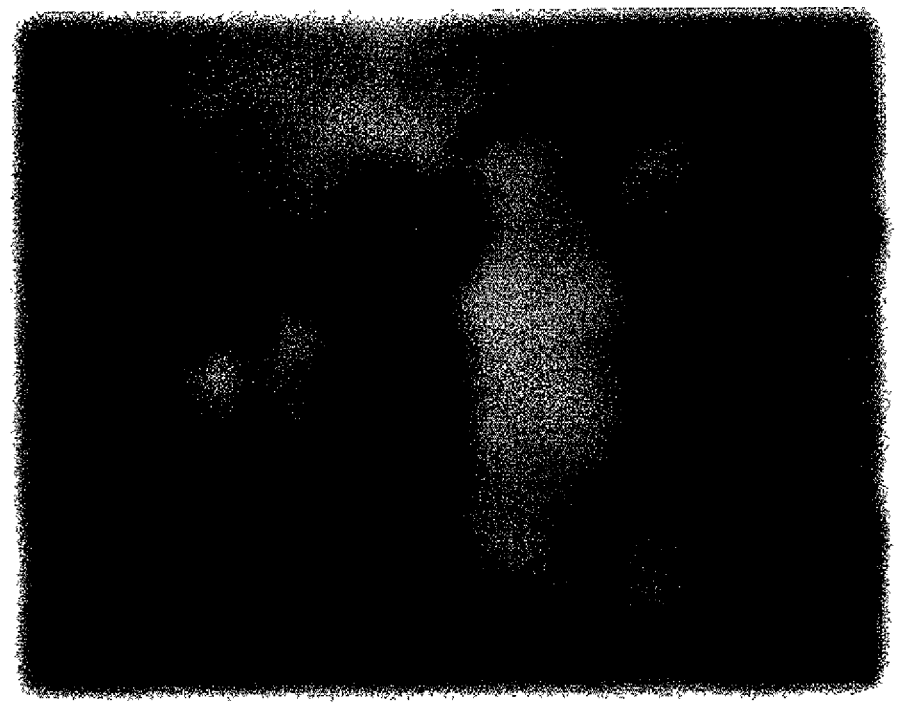
Figure 14B:
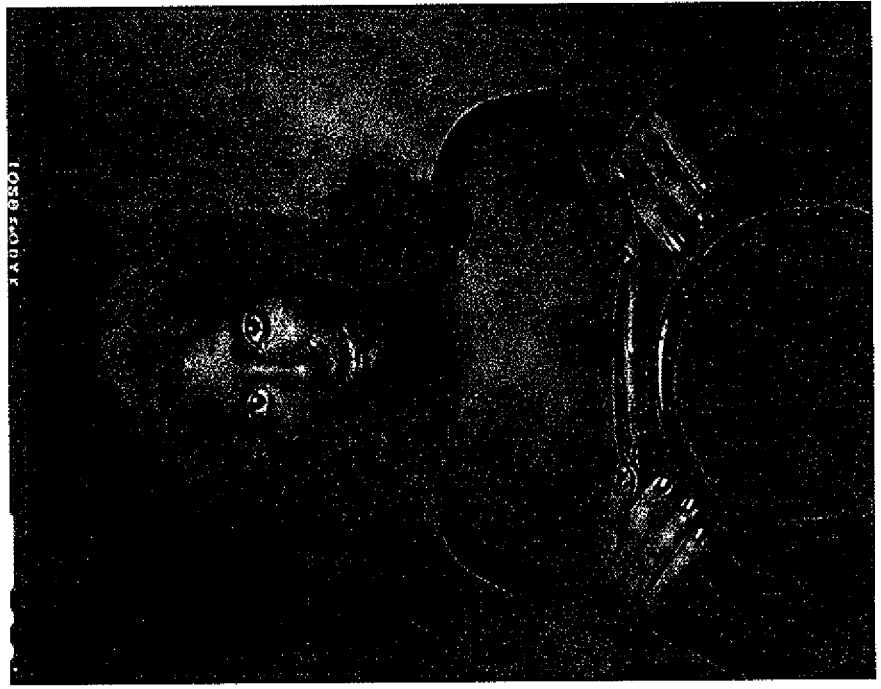
FIGS. 14A and 14B show respectively the image of FIG. 11 as grey scale positives of the yellow separation using the method of the invention and conventional technology.
Figure 14A:
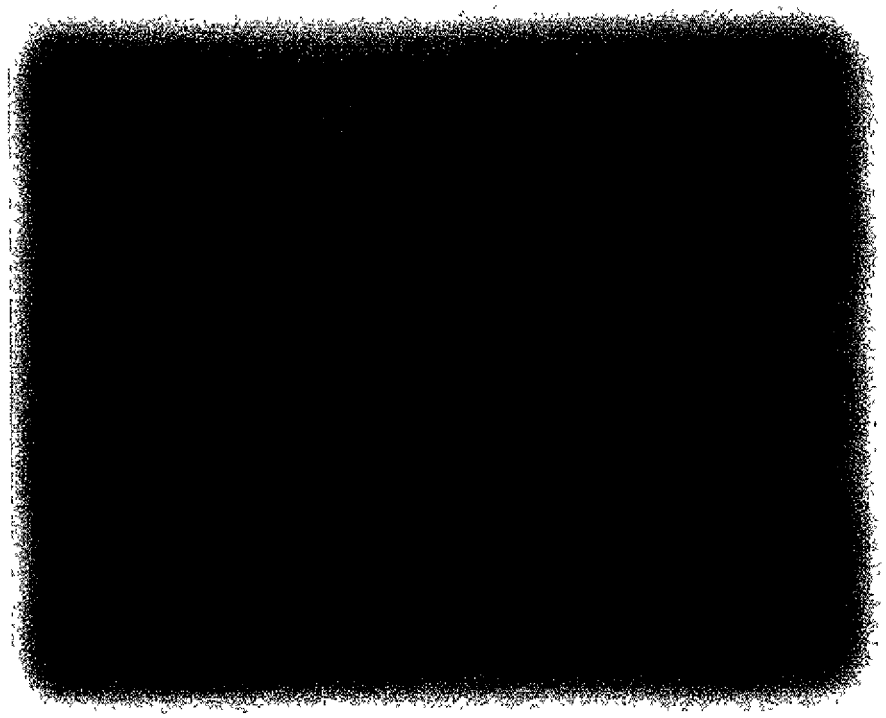
Figure 15B:
FIGS. 15A and 15B show respectively the image of FIG. 11 as greyscale positives of the black separation using the method of the invention and conventional technology.
Figure 15A:

The portrait of FIGS. 10-15 illustrate the next simplest case where n=3. The inks chosen here are magenta, yellow, and black. In this example, the black separation would serve as the luminance channel while the yellow and magenta separations would be treated as chrominance channels. As before, the black separation would preferably be sharpened to amplify detail while the yellow and magenta separations would be blurred to remove detail. In general, the greatest amount of blurring would be associated with the lightest colored ink. However, once again this would also depend on the scene's object colors. FIGS. 10A and 10B illustrate CMYK original image reproductions that are respectively in and out-of-register. All separations were shifted 2.5 mm in their given direction. The out-of-register image would certainly be unacceptable even with the most relaxed standards. For the n=3 case, this image was reproduced using a three-ink system, magenta, yellow, and black (MYK). FIGS. 11A and 11B respectively illustrate the MYK reproduction in and out-of-register. It is immediately evident that the original four ink and the three ink versions are nearly indistinguishable. As with the two ink example, FIGS. 12A and 12B respectively simulate an MYK reproduction using the method of invention and in and out-of-register. There is very little discernable difference between FIGS. 12A and 12B in spite of the fact that the separations in the latter have been shifted 2.5 mm in opposing directions. FIGS. 13-15 compare the side-by-side greyscale positives of the magenta, yellow and black separations with and without the method of the present invention. Note again, that the chrominance channels shown in FIGS. 13A and 14A convey virtually no detail. Without the luminance separation shown in FIG. 15A, one could not easily discern the composite image using the method of the present invention.

In the common situation where four inks are used (n=4), process colors of CMYK are usually implied. In some cases non-process inks might also be chosen. In usual practice, the presumption is that with four or more inks, a black ink would almost always be present. Hence, the black separation would be designated to convey luminance while the cyan, magenta and yellow separations would convey chrominance. In the unlikely event there is no black in the ink set, again, the general principle of selecting that separation carrying the best luminance content would be selected.

Figure 16A:
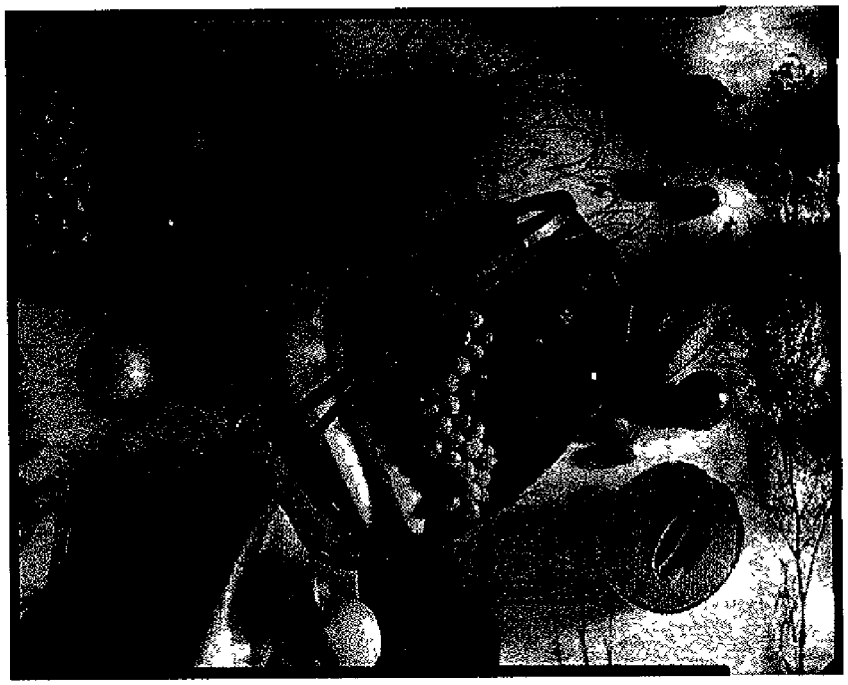
FIGS. 16A and 16B show respectively a still life image as a four color reproduction in and out of register as it would appear using conventional printing technology.
Figure 16B:
Figure 17A:
FIGS. 17A and 17B show respectively a four color reproduction of the image of FIG. 16 in and out of register but modified to increase luminance content of the black separation.
Figure 17B:
Figure 18A:
FIGS. 18A and 18B show respectively a modified four color reproduction of the image of FIG. 16 in and out of register using the method of the present invention.
Figure 18B:
Figure 19A:
FIGS. 19A and 19B show respectively the images of FIGS. 18A and 18B with a border applied to frame the image.
Figure 19B:
Figure 20A:
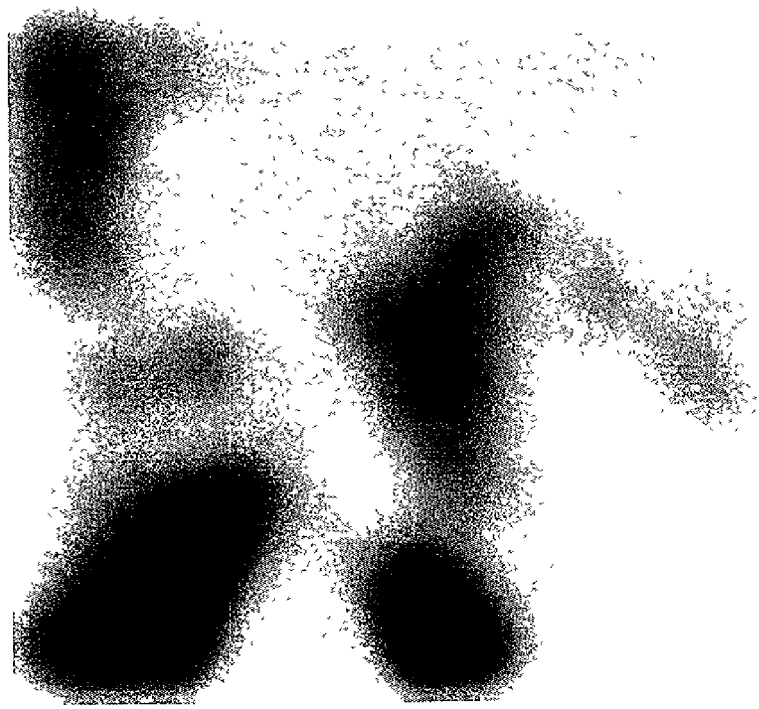
FIGS. 20A and 20B show respectively greyscale positive images of the cyan separation of the image of FIG. 16 using the method of the present invention and conventional technology.
Figure 20B:
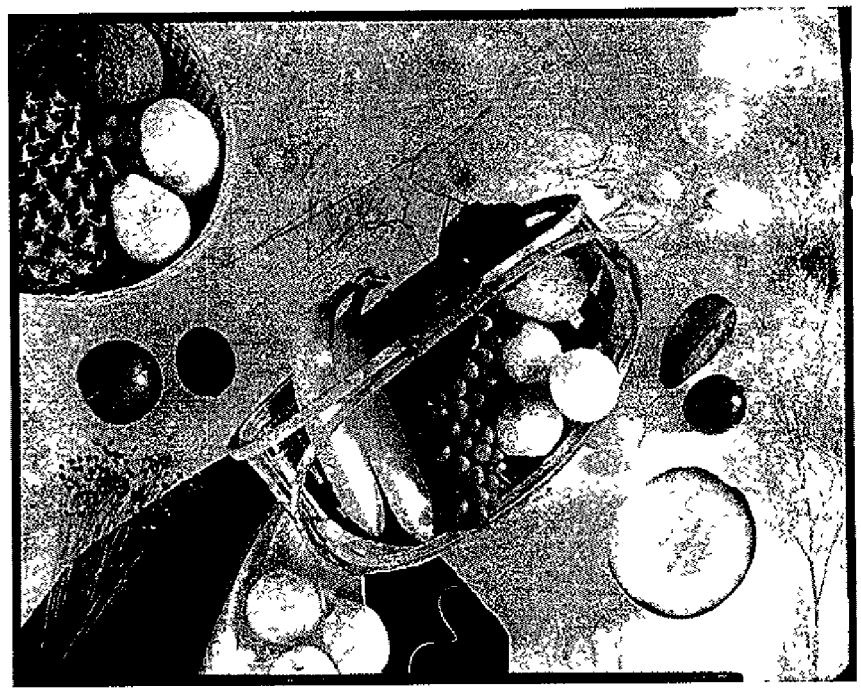
Figure 21A:
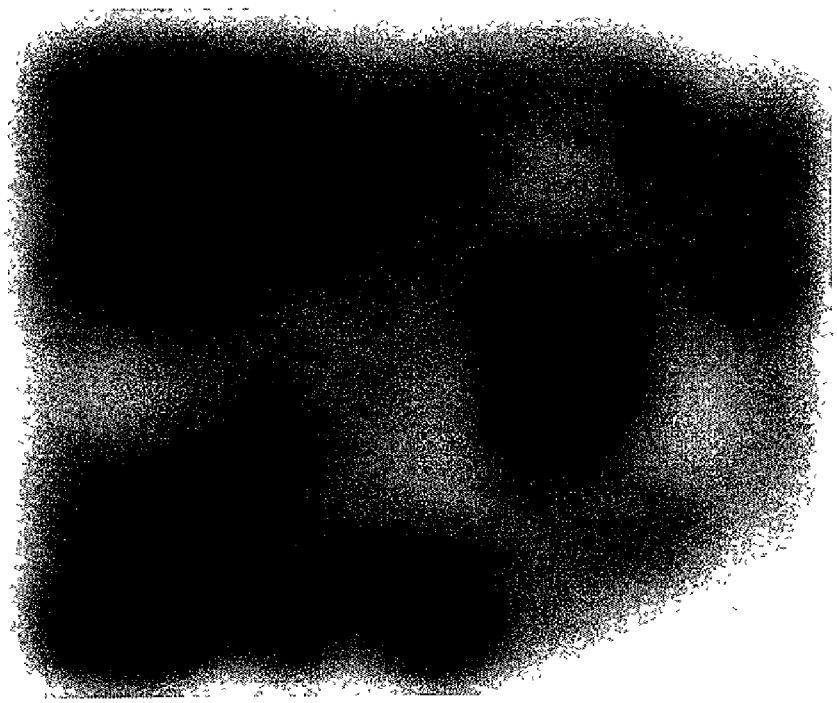
FIGS. 21A and 21B, and 22A and 22B are similar to FIGS. 20A and 20B showing respectively the magenta and yellow separations.
Figure 21B:
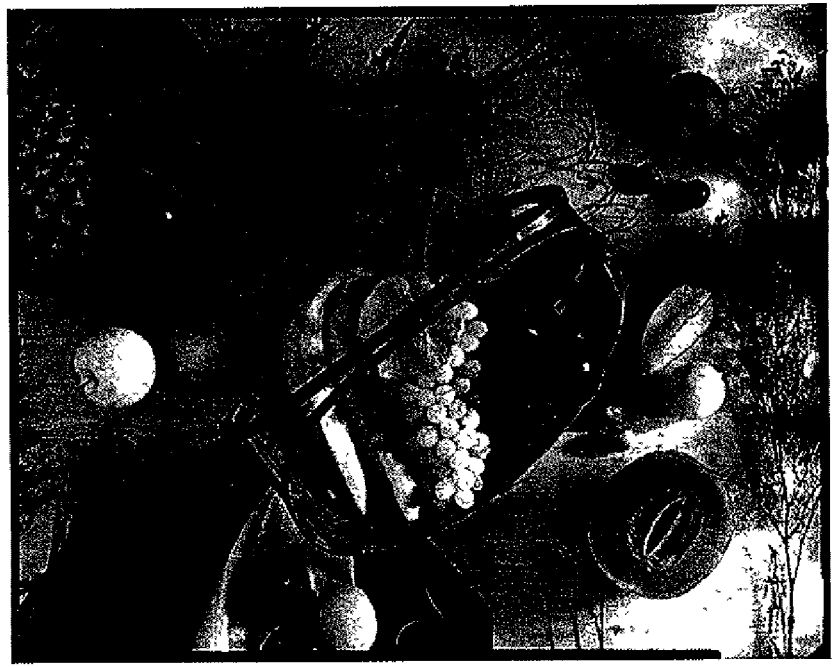
Figure 22A:
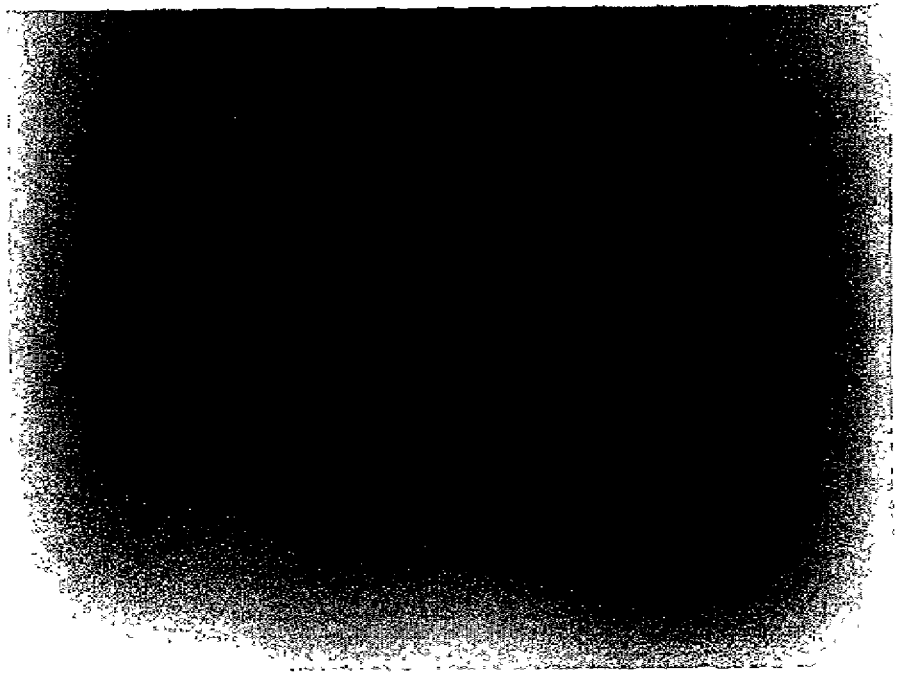
Figure 22B:
Figure 23A:
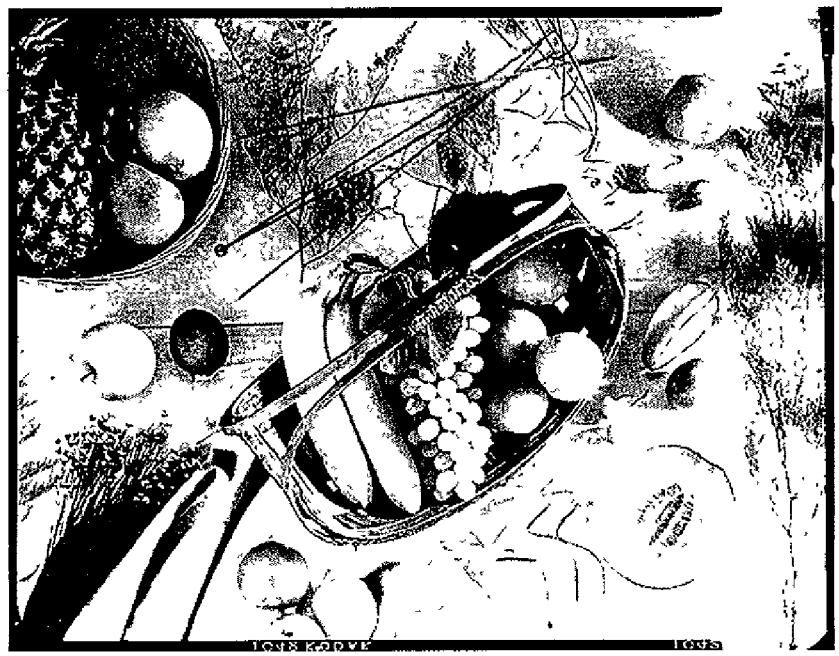
FIGS. 23A and 23B show respectively grey scale positive images of the black separation of the image of FIG. 16 using the method of the present invention and conventional technology.
Figure 23B:
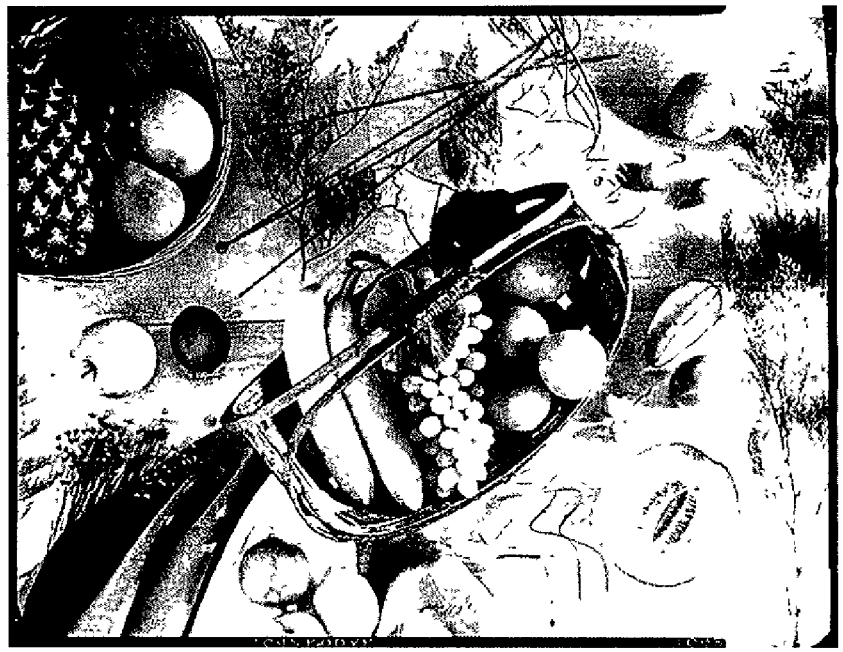

The still life photograph of FIGS. 16A and 16B respectively illustrate a conventionally separated CMYK reproduction in and out-of-register. FIGS. 17A and 17B respectively illustrate a modified CMYK reproduction in and out-of-register. The modified separation was arrived at by blending the conventional black separation from FIG. 16A with its L* channel to obtain better luminance content than the original K separation provided. Very little difference is visually apparent between FIGS. 16 and 17. FIGS. 18A and 18B respectively, using the method of the present invention, illustrate the modified CMYK reproduction in and out-of-register. To remove visual cues that suggest misregister, in FIGS. 19A and 19B a dark border (rendered in the black separation) has been applied to the illustrations of FIGS. 18A and 18B. With such a border, it is very difficult to discern that FIG. 19A is in-register while FIG. 19B is out-of-register, 2.5 mm per plate. FIGS. 20-23 compare the greyscale positives of the cyan, magenta, yellow and black separations with and without the method of the invention, respectively. Once more, details in the chrominance channels (FIGS. 20A, 21A, and 22A) are absent.

It is important to emphasize at this point that the method of invention does not necessarily preserve completely accurate colors with respect to the original, as in a color-managed sense using source and destination color profiles that provide a closed-loop workflow. The method of invention can certainly be applied under such conditions and this is recommended. However, the primary purpose of the present invention is to obtain acceptable print reproductions that are tolerant to plate misregistration. Because the low pass filtering operations reduce channel densities; i.e., they desaturate colors in the composite image, additional adjustment steps may be taken to return color saturation to more proper levels. Even so, precise calorimetric reproduction may not always be achievable. It is important to recognize that the method focuses on eliminating the unpleasant and degrading artifacts associated with misregistered images. This is a trade off for a reproduction that produces realistic color as opposed to one giving accurate color. "Realistic color" means relative accuracy; e.g., an apple is still rendered as red, bananas are rendered yellow, leaves are reproduced as green. It is entirely acceptable when one does not need to achieve absolute accuracy in object colors. "Accurate color" refers to either an absolute colorimetric match or a perceptual match where the need for agreement between original and reproduction is quite stringent.

The amount of blurring of the chrominance channels, i.e., the size of the Gaussian kernel radius, is a function of many things. These include but are not limited to the color of the separation channel, image size, object sizes, and image resolution. Because the required degree of blurring of the chrominance channels is directly proportional to the amount of expected phase error, the still life photograph of FIGS. 24-28 illustrate CMYK reproduction quality as a function of amount of misregister. FIGS. 24A and 24B respectively illustrate conventional and modified CMYK reproductions in-register. As was described earlier, the modified separation was arrived at by blending the conventional black separation from FIG. 24A with its L* channel to obtain better luminance content than the original K separation provided. In the remaining figures, ink separations for each image have been shifted by increasing amounts to evaluate how robust the method is to magnitude in error. In the following series of figures, those with an "A" designation have been conventionally generated while those with the "B" designation have been made using the method of the invention. All separations in the conventional and modified composite images shown in FIGS. 25A and 25B have been shifted 0.2 mm in opposing directions. Even with this relatively small shift, FIG. 25A begins to exhibit small but noticeable artifacts due to misregister. These same artifacts are less visible in FIG. 25B which uses the method of the present invention. In a similar manner to FIG. 25, FIGS. 26A and 26B, 27A and 27B, and 28A and 28B illustrate phase errors of 0.6, 1.2 and 2.0 mm, respectively. As FIG. 26A demonstrates, once registration error exceeds 0.6 mm, the print is borderline unusable. FIG. 26B, while not necessarily yielding the most saturated colors of the original is still usable. It does not display the annoying artifacts of its counterpart in FIG. 26A. The image in FIG. 24A is a very difficult picture to reproduce given its highly saturated, out-of-gamut colors and detail. Yet surprisingly, with the method of invention, still usable prints can be obtained even when phase error approaches 2.0 mm per plate.

Determination of Degree of Blurring Required in Chrominance Separations

Many of the previous examples called for shifting each color separation in a given direction by some expected amount to visually simulate misregister. Because any one plate in practice can shift randomly an infinite number of ways during printing, it is not necessary to model a given separation's shift so precisely. Based on the orientation of the image, and the known registration tolerances for a given printing device, one can usually determine in advance what the average maximum directional errors will be for each printing plate. For purposes of illustration, out of register separations in the earlier figures have been arbitrarily shifted in one of the four cardinal directions (see FIG. 4).

In preparing separations using the present invention, each separation would typically be initially shifted by some expected amount and direction to determine the amount of blurring needed, e.g., by using software such as Adobe Photoshop®. The amount actually shifted will be determined by knowledge of the characteristics of the particular printing device being used. Registration errors are typically higher in the machine direction than in the cross direction, although they can occur randomly.

Figure 29:
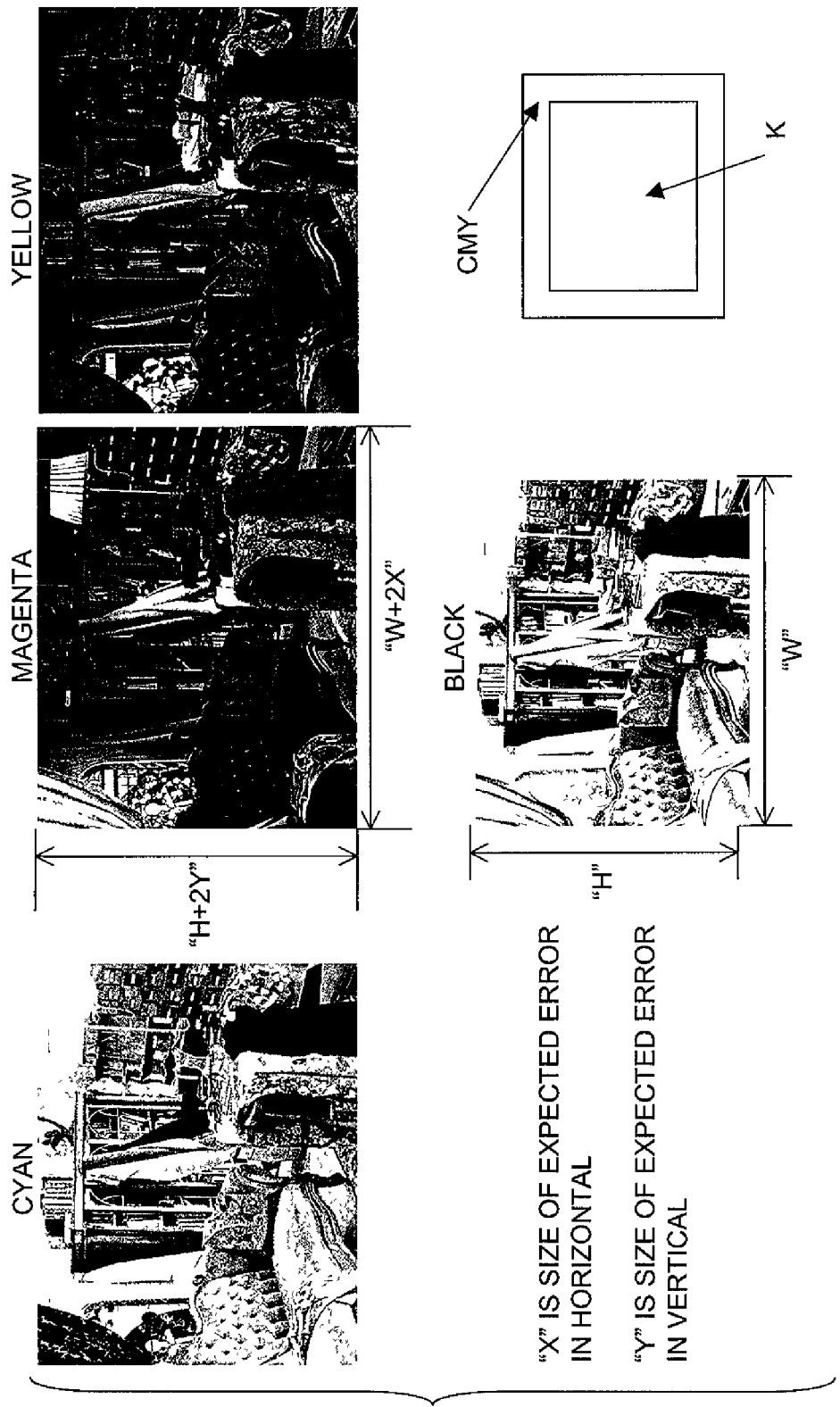
FIG. 29 illustrates an alternative method for initializing the separations prior to any subsequent image processing for generating misregistration tolerant separations.

There is an alternative method which does not call for separation shifting as described above. This is to enlarge each of the chrominance separations by an amount equal to roughly two times the expected registration error, as seen in FIG. 29. For example, consider an arbitrary image with units of width "w" and height "h", where image height is parallel to the printing device direction. Assume that the maximum average registration error is known to be ±"y" units in the machine-direction and ±"x" units in the cross-direction. Using the alternative approach, each chrominance separation would be enlarged to a final size of "w+2x" by "h+2y". The luminance separation would retain its original dimension. Either method produces similar results. Should this method be used to initialize the chrominance separations, each of these images would ultimately be reduced in size to yield chrominance separations having the same dimensions as the luminance channel. This resizing operation would be done once all image processing operations described in FIG. 3 have been completed and misregistration tolerant separations are ready for extraction.

Once separations have been shifted (or enlarged) to simulate plate movement, the next step calls for the blurring of each of the chrominance separations. Many of the image processing steps specific to the method of invention could be readily programmed into computer software. For present purposes, using the interactive processing environment of Adobe Photoshop®, it was relatively easy to apply a suite of standard imaging processing operations to each of the separations in the proper sequence. A visual comparison between the "adjusted" out-of-register composite image and the in-register composite original was used to arrive at subsequent adjustments if needed. The final misregistration tolerant separations were produced once further improvement to each separation, and the composite image, was no longer required.

Figure 30:
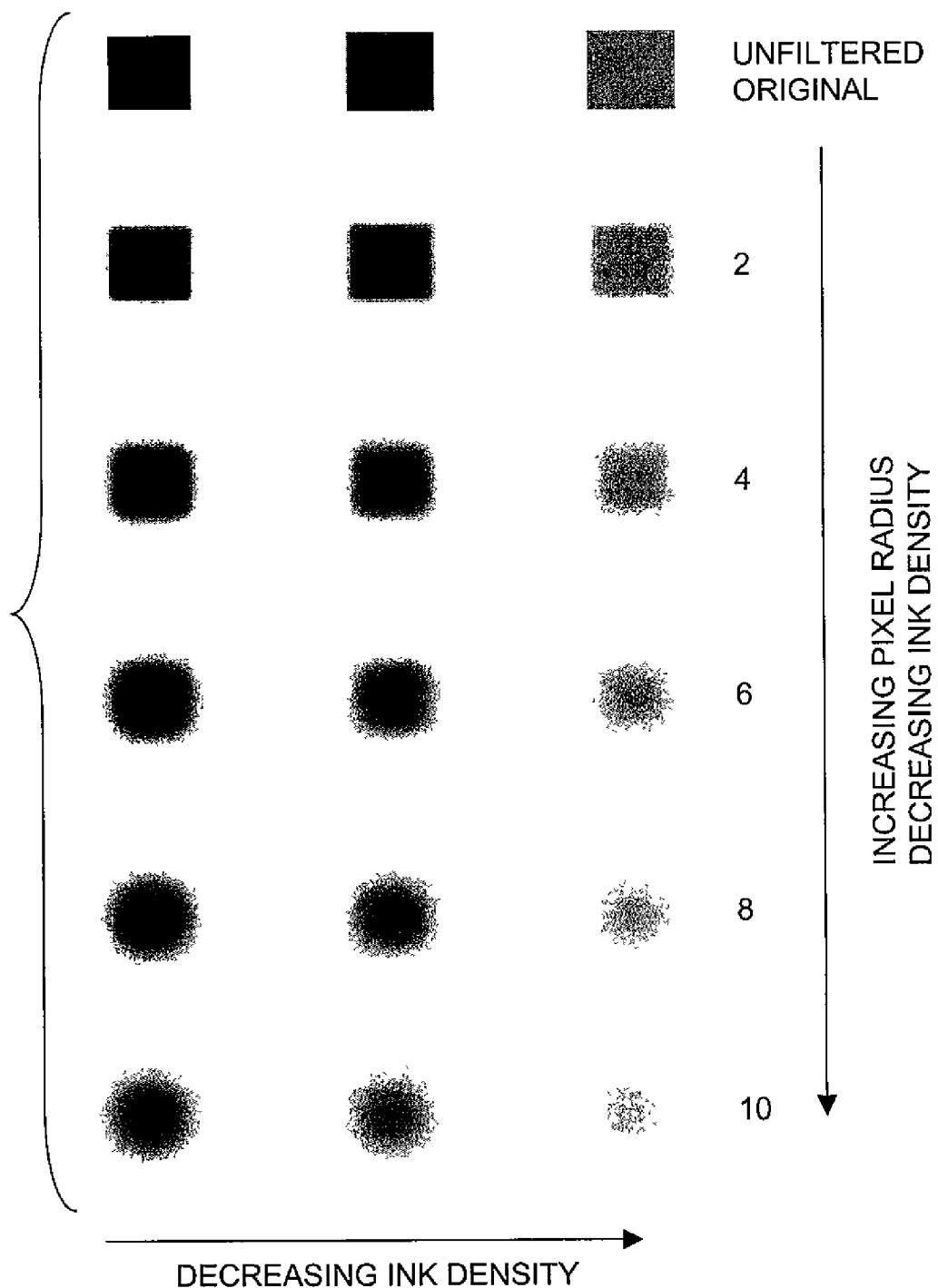
FIG. 30 illustrates the effects of applying a Gaussian blurring filter on a simple image of varying densities, as a function of kernel radius.
Figure 31B:
FIGS. 31A and 31B show again the respective greyscale positives of the magenta and yellow separations of the portrait of FIG. 10A.
Figure 31A:
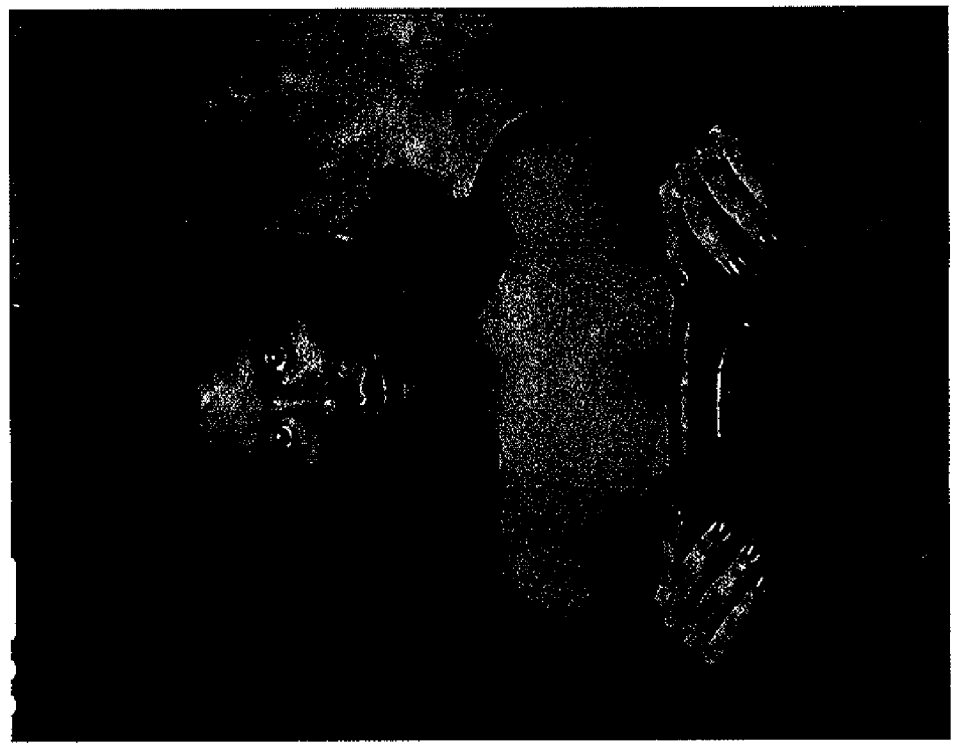
Figure 32B:
FIGS. 32A and 32B show respectively the blurred positive greyscale magenta separation of FIG. 10A and the blurred positive after density adjustment.
Figure 32A:
Figure 33B:
FIGS. 33A and 33B show respectively the blurred positive greyscale yellow separation of FIG. 10A and the blurred positive after density adjustment.
Figure 33A:

Image processing operations that are global in nature apply to the entire image in a given separation. Local operations refer to regions of interest for a given separation. We have generally found the Gaussian blurring filter to be an adequate method for removing high frequency content and that is the method used with all of the figures. However, the method of invention does not rule out the application of other low-pass filters or other blurring kernels. FIG. 30 illustrates the effects of applying a Gaussian kernel of varying radius on a simple image with different ink densities. Notice how the integrated density of a blurred object decreases with increasing kernel radius. Likewise observe how the shape of the original object begins to assume the bell shape of the Gaussian filter as kernel radius increases.

Figure 11B:
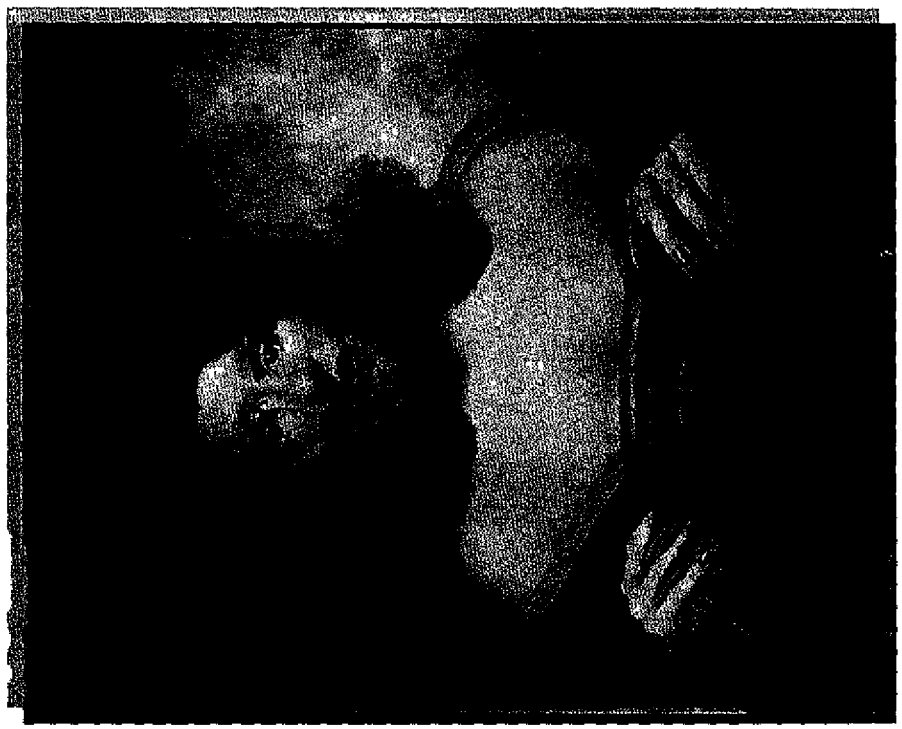
FIGS. 11A and 11B show respectively the image of FIG. 10 as a three color magenta, yellow, black reproduction in and out of register as it would appear using conventional printing technology.
Figure 11A:
Figure 12B:
FIGS. 12A and 12B show respectively the image of FIG. 10 as a three color magenta, yellow, black reproduction in and out of register using the method of the present invention.
Figure 12A:

FIGS. 31-34 provide examples of global and local low-pass filtering operation applied to the magenta and yellow chrominance channels associated with the composite image in FIG. 11A. The greyscale positive magenta and yellow separations shown earlier as FIGS. 13B and 14B are shown again side-by side as FIGS. 31A and 31B. To apply a global low-pass filtering operation, a Gaussian convolution kernel is applied to a given separation where the pixel radius governing the degree of blurring is interactively increased or decreased while viewing the composite image until all or most of the undesirable edges and registration artifacts vanish. The amount of blurring, controlled by the kernel radius, is a function of such things as its separation color, colors of remaining separations, picture size, object size, and image resolution. Multiple implementations of the Gaussian filter may need to be done by differing amounts depending on the separation under consideration. While other types of blurring kernels would be suitable, a symmetrical filter, such as the Gaussian, produces excellent results since plate movement is two-dimensional even though phase error is anisotropic. The Gaussian convolution kernel increases the mean grey level of a channel. Equivalently, it decreases integrated ink density. To compensate, greyscale intensities should be reduced in each blurred separation in order to restore channel density to its original level and provide better color saturation in the composite image. FIGS. 32A and 32B respectively show the magenta separation as it was originally and after density adjustment. FIGS. 33A and 33B similarly show the yellow separations. This is done by interactively adjusting grey levels for a given separation while simultaneously comparing the adjusted composite image with the original. The adjustment amount is determined by noting when average color saturation in the composite reaches an acceptable level or a level resembling one in the original.

After global blurring of the chrominance separations, the reconstructed composite image is compared to the original to determine if the misregistration tolerant separations render an acceptable image; i.e., one absent of unacceptable image artifacts. If not, then additional blurring is performed until this criterion is met. Then the luminance channel is preferably processed with a sharpening filter. While this is an optional step, for most images intentional sharpening of the luminance channel usually produces better results and is generally recommended unless the goal is to achieve a softer composite.

Figure 34B:
FIGS. 34A and 34B show respectively the original greyscale positive of FIG. 10A and the same positive after unsharp masking.
Figure 34A:

Of the many high-pass filters one could apply, we have found the traditional unsharp masking technique to yield good results. Many image processing programs such as Adobe Photoshop® provide a digital implementation of this well-known and established photographic technique. FIGS. 34A and 34B show the original greyscale positive of FIG. 11A before and after sharpening the luminance channel image. Depending on image, the unsharp masking operation could be repeatedly applied to produce the desired result. As before, the degree of sharpening is controlled by the user where adjustments are made based on a visual assessment of the separation's sharpness, compared to its original, unsharpened version. Once done, the processed composite image is compared to its original to determine if the level of detail and object colors in the original are satisfactory in the composite. If the results of the unsharp masking operation are acceptable, then the next step is to evaluate the performance of the misregistration-tolerant separations. This process can be iterative until the processed luminance channel renders an acceptable composite.

Figure 35B:
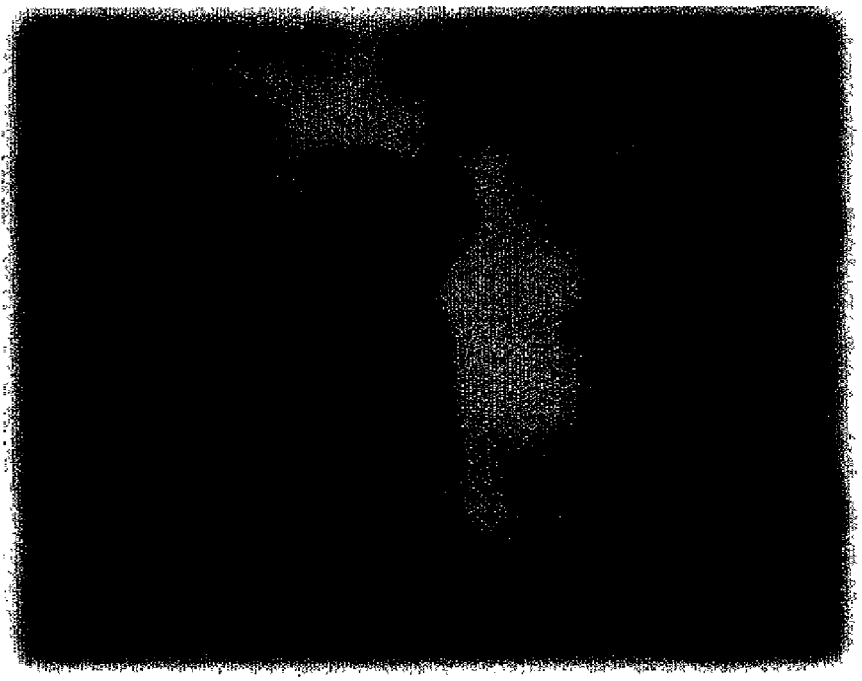
FIG. 35B shows the greyscale positive of the magenta separation of FIG. 35A after local blurring of the regions indicated.
Figure 35A:
FIG. 35A shows the composite image obtained from FIGS. 32B, 33B, and 34B where each separation has been shifted in opposite directions from that of FIG. 12B to assess performance.
Figure 36B:
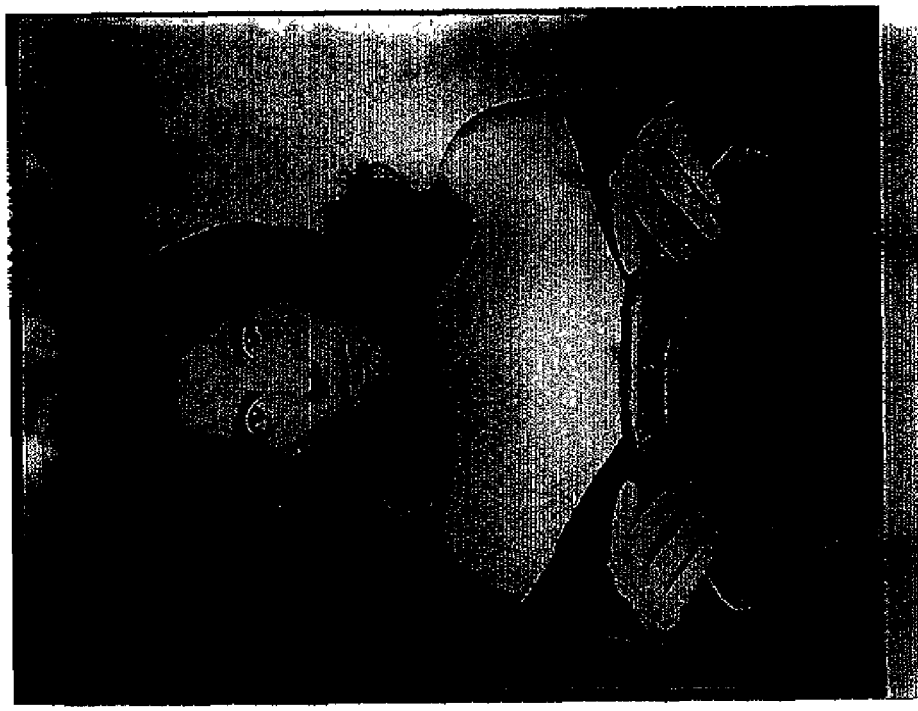
Figure 36A:
Figure 37B:
FIGS. 37A and 37B respectively illustrate a conventionally separated out-of-register image with one made using the present method, where separations were shifted 90° to those of FIG. 4.
Figure 37A:

If the performance assessment fails to produce an acceptable quality image despite global blurring and sharpening operations, then local blurring and density adjustment to specific regions of interest can be performed on those objects or regions which continue to render a poor composite when separations go out of register. FIGS. 35A and 35B illustrate how broad regions of interest such as the woman's face (lips and neck) and hands (fingernails) have been selected to remove the details of the misregistered "red" lips and fingernails in the magenta channel. After an object or region of interest has been selected, if necessary a combination of density adjustment and a subsequent blurring operation is performed to eliminate artifacts. Locally blurred FIG. 35B should be compared with its equivalent FIG. 32B.

FIGS. 36A, 36B, 37A, and 37B illustrate one of the many ways for evaluating the robustness of misregistration tolerant separations. Based on the assumption that the printing plate/paper system behaves more or less randomly from reproduction to reproduction, misregistration can be modeled by shifting each separation in other directions, e.g. the opposite direction from their initial positions or various combinations thereof. The present examples have used a rather simple method to assess performance, statically simulating misregistration. The method of invention does not rule out the use of more elaborate means for performing this assessment. A key point to emphasize in performance assessment is the need for gauging reproduction quality under various degrees of simulated misregister. The random behavior of plate/paper movement needs to be assessed before a final set of misregistration tolerant separations can be considered complete. Even if the alternate method of enlarging the chrominance separations was used, the above procedure of shifting each separation in random directions should be done to physically model phase and evaluate the performance of the method under actual "noisy" reproduction conditions.

If the performance assessment yields ink separations that produce an acceptable composite image under varying amounts of phase error, then final separations are ready to be extracted and each image channel inverted to a negative to yield a final ink separation. At this time, if desired or necessary, a dark border, usually black or its surrogate color, can be added to frame the entire image; e.g., as shown in FIGS. 19A and 19B. The addition of an image frame relies on traditional trapping methods. It is obviously intended to remove visual cues to misregister which is mostly visible only in the borders of a misregistration tolerant reproduction. This misregistration is not easily seen within the image itself, as would be the case with a conventional reproduction. The dimension and minimum thickness of such a frame border depends on the average maximum amount of misregister expected in the vertical and horizontal direction (see FIG. 29). As size of misregistration decreases so does the frame thickness, if used.

Having thus described the best known mode of practicing the present invention, it will be evident to those skilled in the art that many variations are possible that are not described herein. It is the intention of the inventor that these variations should fall within the scope of the invention if encompassed within the following claims.

I claim:

1. A method of making color separations for color printing which comprises:
    preparing n digital color separations of an original color image, where n is 2 or greater;
    choosing the separation conveying the greatest image detail to be a luminance channel;
    assigning remaining separations as chrominance channels;
    degrading image detail in the chrominance channels; and
    recombining the luminance and chrominance channels to form separations for printing, whereby the visual tolerance of color misregistration in the ultimate printed image is increased.

2. The method of claim 1 in which the black or surrogate color for black separation is processed through a high pass filter to enhance image detail.

3. The method of claim 1 which further comprises initially forming a red, green, blue (RGB) encoded original image;
    converting the RGB encoded image into device independent color units;

further converting the device independent units into device dependent color separations.

4. The method of claim 3 in which the device independent color units are chosen from CIE L*a*b* or CIE XYZ.

5. The method of claim 1 in which the low pass filter blurs the separation by attenuating high frequency content.

6. The method of claim 5 in which the low pass filter comprises a Gaussian blur.

7. The method of claim 1 in which the separations, other than the black or surrogate color for black separation, are degraded globally through the low pass filter.

8. The method of claim 7 in which the separations, other than the black or surrogate color for black separation, are also degraded locally through the low pass filter.

9. The method of claim 1 in which the color separations are in the form of digital images divided into pixels, n is greater than 3, and all pixels are ultimately reproduced by no more than three inks, one ink being black or a surrogate color for black, the black or surrogate color for black channel carrying the image detail.

* * * * *